US012353166B2

(12) United States Patent
Inoue et al.

(10) Patent No.: US 12,353,166 B2
(45) Date of Patent: Jul. 8, 2025

(54) TONER, METHOD FOR MANUFACTURING THE TONER, TONER ACCOMMODATING UNIT, IMAGE FORMING APPARATUS, AND IMAGE FORMING METHOD

(71) Applicants: Daisuke Inoue, Shizuoka (JP); Mitsuaki Hirose, Shizuoka (JP); Yohichi Kitagawa, Shizuoka (JP); Masayuki Ukigaya, Kanagawa (JP); Kenji Komito, Tokyo (JP); Hiroshi Yamada, Shizuoka (JP)

(72) Inventors: Daisuke Inoue, Shizuoka (JP); Mitsuaki Hirose, Shizuoka (JP); Yohichi Kitagawa, Shizuoka (JP); Masayuki Ukigaya, Kanagawa (JP); Kenji Komito, Tokyo (JP); Hiroshi Yamada, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 806 days.

(21) Appl. No.: 17/403,409

(22) Filed: Aug. 16, 2021

(65) Prior Publication Data

US 2022/0057725 A1 Feb. 24, 2022

(30) Foreign Application Priority Data

Aug. 19, 2020 (JP) ................................ 2020-138651

(51) Int. Cl.
*G03G 9/08* (2006.01)
*G03G 9/087* (2006.01)
(Continued)

(52) U.S. Cl.
CPC ........... *G03G 9/081* (2013.01); *G03G 9/0819* (2013.01); *G03G 9/08755* (2013.01);
(Continued)

(58) Field of Classification Search
CPC ......................... G03G 9/0821; G03G 9/09733
See application file for complete search history.

(56) References Cited

U.S. PATENT DOCUMENTS

| | | | |
|---|---|---|---|
| 5,906,704 | A | 5/1999 | Matsuura et al. |
| 2003/0027074 | A1 | 2/2003 | Emoto et al. |

(Continued)

FOREIGN PATENT DOCUMENTS

| | | |
|---|---|---|
| JP | 2005-258298 | 9/2005 |
| JP | 2012-008555 | 1/2012 |

(Continued)

OTHER PUBLICATIONS

Translation of 2015-028601.*

(Continued)

*Primary Examiner* — Peter L Vajda
(74) *Attorney, Agent, or Firm* — Grüneberg and Myers PLLC

(57) ABSTRACT

A toner is provided. The toner comprises toner base particles, resin particles adhered to surfaces of the toner base particles, and an external additive adhered to the surfaces of the toner base particles. The toner base particles each comprising a binder resin, a colorant, and a wax. The toner has a storage elastic modulus G' of $4.0\times10^5$ or less at 70° C. An embedment degree of the external additive is from 15% to 40%, as the embedment degree is measured by stirring 10 g of the toner and 20 g of a carrier in a 50-mL vial at 67 Hz for 60 minutes using a rocking mill.

14 Claims, 2 Drawing Sheets

(51) Int. Cl.
*G03G 9/09* (2006.01)
*G03G 9/093* (2006.01)
*G03G 15/08* (2006.01)
*G03G 21/18* (2006.01)

(52) U.S. Cl.
CPC ....... *G03G 9/08782* (2013.01); *G03G 9/0904* (2013.01); *G03G 9/09328* (2013.01); *G03G 9/09371* (2013.01); *G03G 15/08* (2013.01); *G03G 21/18* (2013.01)

(56) References Cited

U.S. PATENT DOCUMENTS

| | | | |
|---|---|---|---|
| 2003/0096185 | A1 | 5/2003 | Yamashita et al. |
| 2003/0134220 | A1 | 7/2003 | Emoto et al. |
| 2003/0138717 | A1 | 7/2003 | Yagi et al. |
| 2003/0152859 | A1 | 8/2003 | Emoto et al. |
| 2003/0162112 | A1 | 8/2003 | Yamashita et al. |
| 2003/0180644 | A1 | 9/2003 | Nanya et al. |
| 2004/0131961 | A1 | 7/2004 | Watanabe et al. |
| 2004/0157146 | A1 | 8/2004 | Tomita et al. |
| 2005/0112488 | A1 | 5/2005 | Yamada et al. |
| 2005/0164114 | A1 | 7/2005 | Yagi et al. |
| 2005/0180786 | A1 | 8/2005 | Yamada et al. |
| 2005/0186498 | A1 | 8/2005 | Honda et al. |
| 2006/0024097 | A1 | 2/2006 | Yamada et al. |
| 2006/0204883 | A1 | 9/2006 | Nakayama et al. |
| 2006/0240349 | A1 | 10/2006 | Watanabe et al. |
| 2007/0031752 | A1 | 2/2007 | Watanabe et al. |
| 2007/0184370 | A1 | 8/2007 | Yamashita et al. |
| 2007/0297836 | A1 | 12/2007 | Kawasaki et al. |
| 2008/0038649 | A1 | 2/2008 | Hirose et al. |
| 2008/0090165 | A1 | 4/2008 | Yamada et al. |
| 2008/0124638 | A1 | 5/2008 | Hirose et al. |
| 2008/0227000 | A1 | 9/2008 | Honda et al. |
| 2008/0233498 | A1 | 9/2008 | Yamada et al. |
| 2008/0268366 | A1 | 10/2008 | Nakayama et al. |
| 2008/0280218 | A1 | 11/2008 | Sabu et al. |
| 2008/0280219 | A1 | 11/2008 | Nakayama et al. |
| 2008/0318142 | A1 | 12/2008 | Kawasaki et al. |
| 2009/0010687 | A1 | 1/2009 | Yamada et al. |
| 2009/0117480 | A1 | 5/2009 | Yamada et al. |
| 2009/0226836 | A1 | 9/2009 | Uchinokura et al. |
| 2010/0150606 | A1 | 6/2010 | Tamoto et al. |
| 2010/0260513 | A1 | 10/2010 | Kawasaki et al. |
| 2010/0285402 | A1 | 11/2010 | Saitoh et al. |
| 2010/0330475 | A1 | 12/2010 | Tamoto et al. |
| 2011/0003244 | A1 | 1/2011 | Inoue et al. |
| 2011/0033796 | A1 | 2/2011 | Yamada et al. |
| 2011/0059393 | A1 | 3/2011 | Tamoto et al. |
| 2011/0065033 | A1 | 3/2011 | Uchinokura et al. |
| 2011/0129773 | A1 | 6/2011 | Shu et al. |
| 2011/0177440 | A1 | 7/2011 | Yamada et al. |
| 2011/0223532 | A1 | 9/2011 | Sugimoto et al. |
| 2011/0262856 | A1 | 10/2011 | Sugimoto et al. |
| 2011/0286777 | A1 | 11/2011 | Sugino et al. |
| 2011/0305986 | A1 | 12/2011 | Ogawa et al. |
| 2012/0064445 | A1 | 3/2012 | Kojima et al. |
| 2012/0288299 | A1 | 11/2012 | Uchinokura et al. |
| 2012/0321348 | A1 | 12/2012 | Toriu et al. |
| 2013/0022371 | A1 | 1/2013 | Kusahara et al. |
| 2013/0022902 | A1 | 1/2013 | Shimoyama et al. |
| 2013/0059242 | A1 | 3/2013 | Asano et al. |
| 2013/0059243 | A1 | 3/2013 | Hirose et al. |
| 2013/0130174 | A1 | 5/2013 | Yamada et al. |
| 2013/0196260 | A1 | 8/2013 | Yoshida et al. |
| 2013/0196261 | A1 | 8/2013 | Uchinokura et al. |
| 2013/0224648 | A1 | 8/2013 | Honda et al. |
| 2013/0243483 | A1 | 9/2013 | Hirose et al. |
| 2013/0243488 | A1 | 9/2013 | Kojima et al. |
| 2013/0244155 | A1 | 9/2013 | Satoh et al. |
| 2013/0244156 | A1 | 9/2013 | Kojima et al. |
| 2013/0244158 | A1 | 9/2013 | Awamura et al. |
| 2013/0251401 | A1 | 9/2013 | Asano |
| 2013/0259552 | A1 | 10/2013 | Hasegawa et al. |
| 2013/0330104 | A1 | 12/2013 | Shimoyama et al. |
| 2014/0030644 | A1 | 1/2014 | Hasegawa et al. |
| 2014/0065534 | A1* | 3/2014 | Amemori ........... G03G 9/08782 430/105 |
| 2014/0093294 | A1 | 4/2014 | Komito et al. |
| 2014/0093820 | A1 | 4/2014 | Satoh et al. |
| 2014/0242514 | A1 | 8/2014 | Inoue et al. |
| 2014/0272695 | A1 | 9/2014 | Moritani et al. |
| 2014/0342283 | A1 | 11/2014 | Yamamoto et al. |
| 2015/0072286 | A1* | 3/2015 | Kumai ............... G03G 9/08755 430/109.4 |
| 2015/0139710 | A1 | 5/2015 | Hasegawa et al. |
| 2015/0248070 | A1 | 9/2015 | Chiba et al. |
| 2015/0253687 | A1 | 9/2015 | Chiba et al. |
| 2015/0261113 | A1 | 9/2015 | Takeyama et al. |
| 2016/0195826 | A1 | 7/2016 | Kimura et al. |
| 2016/0195827 | A1 | 7/2016 | Murayama et al. |
| 2016/0195828 | A1 | 7/2016 | Satoh et al. |
| 2016/0259257 | A1 | 9/2016 | Sugimoto et al. |
| 2016/0370720 | A1 | 12/2016 | Yamashita et al. |
| 2016/0378006 | A1 | 12/2016 | Itoh et al. |
| 2017/0010550 | A1 | 1/2017 | Nagata et al. |
| 2017/0017175 | A1 | 1/2017 | Yamada et al. |
| 2017/0090399 | A1 | 3/2017 | Komito et al. |
| 2017/0108791 | A1 | 4/2017 | Hashida et al. |
| 2017/0212435 | A1 | 7/2017 | Hirose et al. |
| 2017/0371257 | A1 | 12/2017 | Santo et al. |
| 2018/0024452 | A1 | 1/2018 | Sugimoto et al. |
| 2018/0052403 | A1 | 2/2018 | Inoue et al. |
| 2018/0224763 | A1 | 8/2018 | Tanaka et al. |
| 2018/0253022 | A1 | 9/2018 | Takeda et al. |
| 2018/0373198 | A1 | 12/2018 | Mizusawa et al. |
| 2019/0011845 | A1 | 1/2019 | Toshine et al. |
| 2019/0086828 | A1* | 3/2019 | Tsujihiro ............ G03G 9/09758 |
| 2019/0171122 | A1 | 6/2019 | Ukigaya et al. |
| 2019/0271927 | A1 | 9/2019 | Inoue et al. |
| 2020/0103775 | A1 | 4/2020 | Kitagawa et al. |
| 2020/0233325 | A1 | 7/2020 | Nakamura et al. |
| 2020/0292954 | A1 | 9/2020 | Aoyama et al. |
| 2020/0301348 | A1 | 9/2020 | Nakayama et al. |
| 2021/0063916 | A1 | 3/2021 | Takei et al. |
| 2021/0173337 | A1 | 6/2021 | Inoue et al. |

FOREIGN PATENT DOCUMENTS

| | | | |
|---|---|---|---|
| JP | 2013-105153 | 5/2013 | |
| JP | 2014-063117 | 4/2014 | |
| JP | 2014-178473 | 9/2014 | |
| JP | 2014-194528 | 10/2014 | |
| JP | 2015028601 A * | 2/2015 | ............... G03G 9/08 |
| JP | 2015-087597 | 5/2015 | |

OTHER PUBLICATIONS

U.S. Appl. No. 17/318,396, filed May 12, 2021, Yasuo Kamada, et al.

U.S. Appl. No. 17/325,377, filed May 20, 2021, Hidekazu Kakinuma, et al.

Robert F. Fedors, "A Method for Estimating Both the Solubility Parameters and Molar Volumes of Liquids" Polymer Engineering & Science, Feb. 1974, vol. 14, No. 2, 147-154.

T. G. Fox, "The Effect of Diluents on the Second-Order Transition and Flow Properties of Polystyrene", Phys. Rev., vol. 86(4), p. 652 (1952), invited paper from "Proceedings of the American Physical Society" (26 pages).

Japanese Office Action dated Mar. 5, 2024, in Japanese Patent Application No. 2020-138651, 3 pages.

* cited by examiner

TONER, METHOD FOR MANUFACTURING THE TONER, TONER ACCOMMODATING UNIT, IMAGE FORMING APPARATUS, AND IMAGE FORMING METHOD

CROSS-REFERENCE TO RELATED APPLICATIONS

This patent application is based on and claims priority pursuant to 35 U.S.C. § 119(a) to Japanese Patent Application No. 2020-138651, filed on Aug. 19, 2020, in the Japan Patent Office, the entire disclosure of which is hereby incorporated by reference herein.

BACKGROUND

Technical Field

The present disclosure relates to a toner, a method for manufacturing the toner, a toner accommodating unit, an image forming apparatus, and an image forming method.

Description of the Related Art

In an electrophotographic image forming method using toner, an electrostatic latent image is formed on a surface of a photoconductor, the electrostatic latent image is developed into a toner image, and the toner image is transferred and fixed onto a medium.

In recent years, toner has been required to have a small particle size and high-temperature offset resistance for higher image quality, low-temperature fixability for energy saving, and heat-resistant storage stability to be resistant to high temperature and high humidity during storage or transportation after manufacture. Since most of the power consumed during an image forming process is used for fixing toner on a recording medium, it is effective for saving energy to improve low-temperature fixability of the toner.

In addition, the toner is required not to cause a phenomenon called "sheet ejection blocking" in which, when sheets having fixed toner images thereon are stacked on a sheet ejection tray, the sheets and the toner come to stick to each other due to pressure caused by the weight of the sheets and residual heat of the fixing process. When the toner receives a stress in a developing device, an external additive is embedded in toner base particles and the adhesive force between the toner and other members is increased, making it difficult to remove the toner by a cleaning blade. The toner is further required not to cause this phenomenon.

SUMMARY

In accordance with some embodiments of the present invention, a toner is provided. The toner comprises toner base particles, resin particles adhered to surfaces of the toner base particles, and an external additive adhered to the surfaces of the toner base particles. The toner base particles each comprising a binder resin, a colorant, and a wax. The toner has a storage elastic modulus G' of 4.0×10 or less at 70° C. An embedment degree of the external additive is from 15% to 40%, as the embedment degree is measured by stirring 10 g of the toner and 20 g of a carrier in a 50-mL vial at 67 Hz for 60 minutes using a rocking mill.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
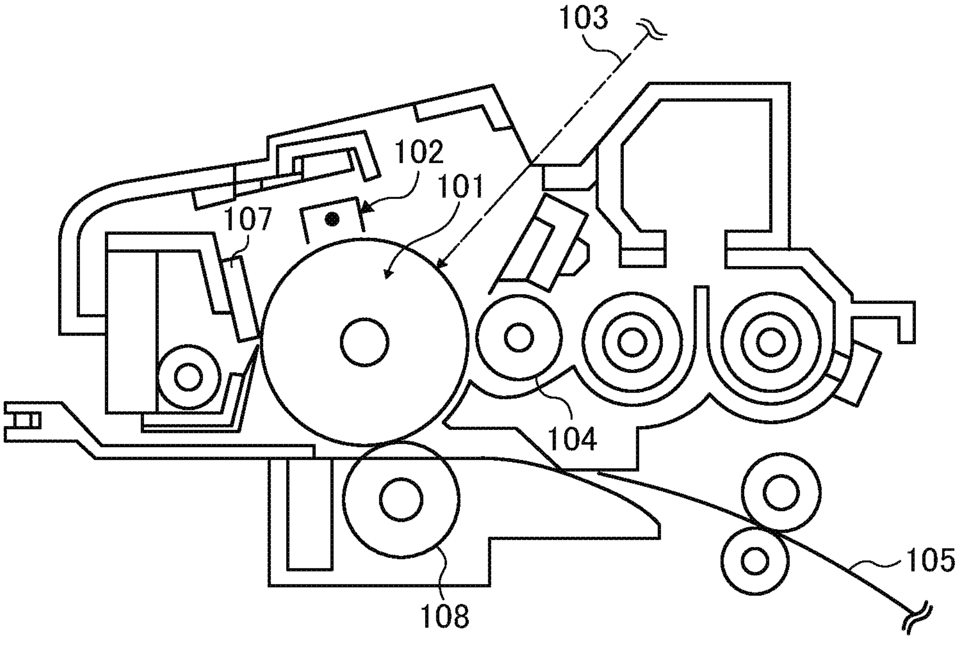
FIG. 1 is a schematic diagram illustrating a process cartridge as the toner accommodating unit according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Embodiments of the present invention provide a toner achieving both low-temperature fixability and cleanability at high levels.

Toner

The toner of the present disclosure contains toner base particles and, if necessary, other components.

To the surfaces of the toner base particles, resin particles and an external additive are adhered.

As a result of intensive studies by the inventors of the present invention, it has been found that a stirring of toner by a rocking mill for 60 minutes roughly reproduces a stress which the toner receives in a developing device. Specifically, it has been found that toner which is resistant to embedment of external additives under a stress caused by stirring by the rocking mill is also resistant to embedment of external additives under a stress caused in the developing device of an actual machine over time.

External Additive

The embedment degree of the external additive in the surface of the toner base particles is from 15% to 40%, preferably from 18% to 30%. When the embedment degree is less than 15%, it means that the external additive is hardly fixed to the toner base particles and is liberated on the toner surface. When the embedment degree is less than 15%, the liberated external additive contaminates carriers and image bearers to inhibit reliable image formation. The embedment degree exceeding 40% indicates that the external additive is substantially embedded in the toner base particles. When the embedment degree exceeds 40%, the spacer function of the external additive is insufficient, and the adhesive force between the exposed surface of the toner base particles and members of the image forming apparatus is increased, thereby causing defective cleaning.

In the present disclosure, the embedment degree of the external additive is a value measured by the following procedure. This value indicates the embedment degree of the external additive after a stress assumed in an actual machine is applied to the toner.

Specifically, 10 g of the toner and 20 g of a carrier (to be described later) are placed in a 50-mL glass vial and stirred at 67 Hz for 60 minutes using a rocking mill (RM05S, product of SEIWA GIKEN Corporation).

After the stirring, the toner is embedded and fixed in an epoxy resin and cut using a focused ion beam—scanning electron microscope (FIB-SEM SU-8230, product of Hitachi High-Technologies Corporation), and a cross-sectional SEM image is observed. The accelerating voltage is set to 30 kv, and the current value is set to 100-500 pA. The embedment degree of the external additive is quantified by analyzing the cross-sectional SEM image of the toner using an image analysis software program as follows.

(1) The cross-section of toner is observed with SEM in a shape image mode. A numerical value obtained from the observed data is defined as A.

(2) The cross-section of toner is observed with SEM in a composite image mode. A numerical value obtained from the observed data is defined as B.

(3) In the shape image mode, a binarization processing is performed based on the contrast of the external additive that is strong.

(4) The shape of the toner base particles is captured by SEM in the composition image mode.

(5) A volume (a) of the external additive present on the surface of the toner base particles and a volume (b) of the external additive embedded in the surface of the toner base particles are calculated by combining A and B. The embedment degree (%) of the external additive is calculated from $(b/a)\times 100$.

The embedment degree of the external additive may be adjusted by, for example, adjusting the average primary particle diameter of the external additive or adjusting the hardness of the surfaces of the toner base particles.

The smaller the average primary particle diameter of the external additive, the more likely the external additive is embedded in the surfaces of the toner base particles due to the stress received during the process (use). The larger the average primary particle diameter, the more the external additive is prevented from being embedded in the surfaces of the toner base particles. Therefore, the embedment degree of the external additive can be adjusted by adjusting the average primary particle diameter of the external additive.

Adjusting the hardness of the surfaces of the toner base particles involves disposing on the surfaces of the toner base particles a material (e.g., styrene-acrylic resin) capable of maintaining elasticity in a temperature range assumed in an actual machine. Disposition of such a material makes it possible to prevent embedment of the external additive even under the stress in the actual machine.

The external additive is not particularly limited and can be suitably selected to suit to a particular application. Specific examples thereof include, but are not limited to, fine particles of silica, hydrophobic silica, metal salts of fatty acids (e.g., zinc stearate, aluminum stearate), fine particles of metal oxide (e.g., titania, alumina, tin oxide, antimony oxide), and fluoropolymers. Each of these can be used alone or in combination with others. Among these, fine particles of silica and fine particles of titania are preferred. Preferably, these external additives are hydrophobized.

Specific examples of commercially-available products of fine particles of silica include, but are not limited to, R972, R974, RX200, RY200, R202, R805, and R812 (products of Nippon Aerosil Co., Ltd.).

Specific examples of commercially-available products of fine particles of titanium oxide (titania) include, but are not limited to, P-25 (product of Nippon Aerosil Co., Ltd.); STT-30 and STT-65C-S (products of Titan Kogyo, Ltd.); TAF-140 (product of Fuji Titanium Industry Co., Ltd.); and MT-150W, MT-500B, MT-600B, and MT-150A (products of TAYCA Corporation).

Specific examples of commercially-available products of fine particles of hydrophobized titanium oxide (titania) include, but are not limited to, T-805 (product of Nippon Aerosil Co., Ltd.); STT-30A and STT-65S-S (products of Titan Kogyo, Ltd.); TAF-500T and TAF-1500T (products of Fuji Titanium Industry Co., Ltd.); MT-100S and MT-100T (products of TAYCA Corporation); and IT-S (product of Ishihara Sangyo Kaisha, Ltd.).

The fine particles of hydrophobized oxides, hydrophobized silica, hydrophobized titania, and hydrophobized alumina can be obtained by treating fine particles of oxides, silica, titania, and alumina, respectively, which are hydrophilic, with a silane coupling agent such as methyltrimethoxysilane, methyltriethoxysilane, and octyltrimethoxysilane. In addition, silicone-oil-treated oxide particles and silicone-oil-treated inorganic particles, which are treated with a silicone oil optionally upon application of heat, are also preferred.

Specific examples of the silicone oil include, but are not limited to, dimethyl silicone oil, methyl phenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy-polyether-modified silicone oil, phenol-modified silicone oil, carboxyl-modified silicone oil, mercapto-modified silicone oil, methacryl-modified silicone oil, and α-methylstyrene-modified silicone oil.

The average particle diameter of primary particles (i.e., number average primary particle diameter) of the external additive is not particularly limited and can be suitably selected to suit to a particular application, but is preferably from 70 to 220 nm. When the average particle diameter of the primary particles of the external additive is from 70 to 220 nm, the external additive is less likely to be embedded in the base particles, so that the cleanability is sufficient.

Preferably, the external additive contains two types of silica particles, and a silica particle A, which has the largest average primary particle diameter among them, has an average primary particle diameter of from 70 to 220 nm. When the external additive contains multiple types of particles, the average primary particle diameter of the external additive is the average of those of all the particles.

A method of measuring the primary number average particle diameter of the external additive is not particularly limited and can be suitably selected to suit to a particular application. For example, the primary number average particle diameter may be measured using a transmission electron microscope (TEM) image of the toner.

The content of the external additive is not particularly limited and can be suitably selected to suit to a particular application. Preferably, the content of the external additive in 100 parts by mass of the toner is from 0.1 to 5 parts by mass, more preferably from 0.3 to 3 parts by mass.

Resin Particles

The resin particles are adhered to the surfaces of the toner base particles.

The volume average primary particle diameter of the resin particles is larger than 5 nm and not larger than 60 nm, preferably larger than 10 nm and not larger than 50 nm.

When the volume average primary particle diameter is 5 nm or less, heat-resistant storage stability may deteriorate. When the volume average primary particle diameter exceeds 60 nm, low-temperature fixability may deteriorate.

The volume average primary particle diameter can be measured using a SEM image as described later.

The volume average primary particle diameter of the resin particles is measured by removing the external additive from the toner as much as possible by an external additive liberation treatment using ultrasonic waves as described below to expose the toner base particles, and observing them with a scanning electron microscope (SEM).

Method for Liberating External Additive

[1] In a 100-mL screw tube, 50 mL of a 5% aqueous solution of a surfactant (NOIGEN ET-165, product of DKS Co., Ltd.) are put, and 3 g of the toner is added thereto. The mixed solution is then gently moved vertically and horizontally. After that, the mixed solution is stirred for 30 min using a ball mill to make the toner become compatible with the solution.

[2] Next, ultrasonic wave energy is applied for 60 minutes using an ultrasonic homogenizer (HOMOGENIZER, model VCX750, CV33, product of Sonics & Materials, Inc.) at an output of 40 W.

Ultrasonic Conditions

Vibration time; continuous 60 minutes

Amplitude: 40 W

Vibration start temperature: 23±1.5° C.

Temperature during vibration: 23±1.5° C.

[3](1) The resulted dispersion liquid is suction filtered with a filter paper (trade name: qualitative filter paper (No. 2, 110 mm), product of Advantec Toyo Kaisha, Ltd.), washed again with ion-exchange water twice, and filtered. After removing the liberated external additive, the toner particles are dried.

(2) The toner obtained in (1) is observed with a scanning electron microscope (SEM).

First, a backscattered electron image is observed to detect external additives or fillers containing Si.

(3) The image obtained in (2) is binarized using an image processing software program (ImageJ) to eliminate the external additives and the fillers.

Next, a secondary electron image is observed at the same position as in (1). The resin particles are not observed in the backscattered electron image and observed only in the secondary electron image. The secondary electron image is compared with the image obtained in (3), and particles present in a portion other than the portion of the residual external additive and the filler (i.e., a portion other than the portion excluded in (3)) are specified as the resin particles. The distance between the resin particles (i.e., the distance between the centers of the particles) is then measured using the image processing software program.

[Photographing Conditions]

Scanning electron microscope: SU8230 (product of Hitachi High-Technologies Corporation)

Photographing magnification: 35,000 times

Photographed image: SE (L): secondary electrons, BSE (reflected electrons)

Acceleration voltage: 2.0 kV

Acceleration current: 1.0 μA

Probe current: Normal

Focus mode: UHR

WD: 8.0 mm The measurement is performed on 100 binarized images (one toner particle per one image), and the average value thereof is treated as the measurement result.

Preferably, the resin particles (hereinafter also referred to as "resin particles (B)") preferably contain a core resin (core portion) and a shell resin (outer shell portion) covering at least part of the surface of the core resin. More preferably, the resin particles consist of the core resin and the shell resin. Still more preferably, the resin particles contain a vinyl unit consisting of a resin (b1) and another resin (b2).

Preferably, the shell resin (hereinafter also referred to as "resin (b1)") and the core resin (hereinafter also referred to as "resin (b2)") are polymers obtained by homopolymerizing or copolymerizing vinyl monomers.

Examples of the vinyl monomers include, but are not limited to, the following (1) to (10).

(1) Vinyl Hydrocarbons

Examples of the vinyl hydrocarbons include, but are not limited to, (1-1) aliphatic vinyl hydrocarbons, (1-2) alicyclic vinyl hydrocarbons, and (1-3) aromatic vinyl hydrocarbons.

(1-1) Aliphatic Vinyl Hydrocarbons

Examples of the aliphatic vinyl hydrocarbons include, but are not limited to, alkene and alkadiene.

Specific examples of the alkene include, but are not limited to, ethylene, propylene, and α-olefin.

Specific examples of the alkadiene include, but are not limited to, butadiene, isoprene, 1,4-pentadiene, 1,6-hexadiene, and 1,7-octadiene.

(1-2) Alicyclic Vinyl Hydrocarbons Examples of the alicyclic vinyl hydrocarbons include, but are not limited to, mono- or di-cycloalkene and alkadiene. Specific examples thereof include, but are not limited to, (di)cyclopentadiene and terpene.

(1-3) Aromatic Vinyl Hydrocarbons

Examples of the aromatic vinyl hydrocarbons include, but are not limited to, styrene and hydrocarbyl (alkyl, cycloalkyl, aralkyl and/or alkenyl)-substituted styrene. Specific examples thereof include, but are not limited to, α-methylstyrene, 2,4-dimethylstyrene, and vinylnaphthalene.

(2) Carboxyl-Group-Containing Vinyl Monomers and Salts Thereof

Examples of the carboxyl-group-containing vinyl monomers and salts thereof include, but are not limited to, unsaturated monocarboxylic acids (salts) and unsaturated dicarboxylic acids (salts) each having 3 to 30 carbon atoms, anhydrides (salts) thereof, monoalkyl (having 1 to 24 carbon atoms) esters thereof, and salts of the monoalkyl (having 1 to 24 carbon atoms) esters.

Specific examples thereof include, but are not limited to: carboxyl-group-containing vinyl monomers such as (meth) acrylic acid, maleic acid and maleic anhydride, maleic acid monoalkyl ester, fumaric acid, fumaric acid monoalkyl ester, crotonic acid, itaconic acid, itaconic acid monoalkyl ester, itaconic acid glycol monoether, citraconic acid, citraconic acid monoalkyl ester, and cinnamic acid; and metal salts thereof.

In the present disclosure, "X (salt)" refers to X or a salt of X.

For example, "an unsaturated monocarboxylic acid (salt) having 3 to 30 carbon atoms" refers to "an unsaturated monocarboxylic acid having 3 to 30 carbon atoms or a salt thereof".

In the present disclosure, "(meth)acrylic" refers to methacrylic or acrylic.

In the present disclosure, "(meth)acryloyl" refers to methacryloyl or acryloyl.

In the present disclosure, "(meth)acrylate" refers to methacrylate or acrylate.

(3) Sulfone-group-containing Vinyl Monomers, Vinyl Sulfuric Acid Monoesters, and Salts thereof Examples of the sulfone-group-containing vinyl monomers, vinyl sulfuric acid monoesters, and salts thereof include, but are not limited to, alkenesulfonic acids (salts) having 2 to 14 carbon atoms, alkylsulfonic acids (salts) having 2 to 24 carbon atoms, sulfo(hydroxy)alkyl-(meth)acrylates (salts), (meth) acrylamides (salts), and alkylaryl sulfosuccinic acids (salts).

Specific examples of the alkenesulfonic acids having 2 to 14 carbon atoms include, but are not limited to, vinylsulfonic acids (salts). Specific examples of the alkylsulfonic acids having 2 to 24 carbon atoms include, but are not limited to, α-methylstyrenesulfonic acids (salts). Specific examples of the sulfo(hydroxy)alkyl-(meth)acrylates (salts) or (meth) acrylamides (salts) include, but are not limited to, sulfopropyl (meth)acrylate (salts), sulfates (salts), and sulfo-group-containing vinyl monomers (salts).

(4) Phosphate-group-containing Vinyl Monomers and Salts thereof

Examples of the phosphate-group-containing vinyl monomers and salts thereof include, but are not limited to, (meth)acryloyloxyalkyl (having 1 to 24 carbon atoms) phosphoric acid monoesters (salts) and (meth)acryloyloxyalkyl (having 1 to 24 carbon atoms) phosphonic acids (salts).

Specific examples of the (meth)acryloyloxyalkyl (having 1 to 24 carbon atoms) phosphoric acid monoesters (salts) include, but are not limited to, 2-hydroxyethyl (meth)acryloyl phosphate (salt) and phenyl-2-acryloyloxyethyl phosphate (salt).

Specific examples of the (meth)acryloyloxyalkyl (having 1 to 24 carbon atoms) phosphonic acids (salts) include, but are not limited to, 2-acryloyloxyethyl phosphonic acid (salt).

Examples of salts of the above (2) to (4) include, but are not limited to, alkali metal salts (e.g., sodium salts, potassium salts), alkaline earth metal salts (e.g., calcium salts, magnesium salts), ammonium salts, amine salts, and quaternary ammonium salts.

(5) Hydroxyl-group-containing Vinyl Monomers Examples of the hydroxyl-group-containing vinyl monomers include, but are not limited to, hydroxy styrene, N-methylol (meth) acrylamide, hydroxyethyl(meth)acrylate, hydroxypropyl (meth)acrylate, polyethylene glycol mono(meth)acrylate, (meth)allyl alcohol, crotyl alcohol, isocrotyl alcohol, 1-butene-3-ol, 2-butene-1-ol, 2-butene-1,4-diol, propargyl alcohol, 2-hydroxyethyl propenyl ether, and sucrose allyl ether.

(6) Nitrogen-containing Vinyl Monomers

Examples of the nitrogen-containing vinyl monomers include, but are not limited to, (6-1) amino-group-containing vinyl monomers, (6-2) amide-group-containing vinyl monomers, (6-3) nitrile-group-containing vinyl monomers, (6-4) quaternary-ammonium-cation-group-containing vinyl monomers, and (6-5) nitro-group-containing vinyl monomers.

Examples of the (6-1) amino-group-containing vinyl monomers include, but are not limited to, aminoethyl (meth) acrylate.

Examples of the (6-2) amide-group-containing vinyl monomers include, but are not limited to, (meth)acrylamide and N-methyl (meth)acrylamide.

Examples of the (6-3) nitrile-group-containing vinyl monomers include, but are not limited to, (meth)acrylonitrile, cyanostyrene, and cyanoacrylate.

Examples of the (6-4) quaternary-ammonium-cation-group-containing vinyl monomers include, but are not limited to, quaternized products of tertiary-amine-group-containing vinyl monomers such as dimethylaminoethyl(meth) acrylate, diethylaminoethyl(meth)acrylate, dimethylaminoethyl (meth)acrylamide, diethylaminoethyl (meth)acrylamide, and diallylamine (which are quaternized with a quaternization agent such as methyl chloride, dimethyl sulfate, benzyl chloride, and dimethyl carbonate).

Examples of the (6-5) nitro-group-containing vinyl monomers include, but are not limited to, nitrostyrene.

(7) Epoxy-group-containing Vinyl Monomers

Examples of the epoxy-group-containing vinyl monomers include, but are not limited to, glycidyl(meth)acrylate, tetrahydrofurfuryl(meth)acrylate, and p-vinylphenyl phenyl oxide.

(8) Halogen-containing Vinyl Monomers

Examples of the halogen-containing vinyl monomers include, but are not limited to, vinyl chloride, vinyl bromide, vinylidene chloride, allyl chloride, chlorostyrene, bromostyrene, dichlorostyrene, chloromethylstyrene, tetrafluorostyrene, and chloroprene.

(9) Vinyl Esters, Vinyl (Thio) Ethers, and Vinyl Ketones

Examples of the vinyl esters include, but are not limited to, vinyl acetate, vinyl butyrate, vinyl propionate, vinyl butyrate, diallyl phthalate, diallyl adipate, isopropenyl acetate, vinyl methacrylate, methyl 4-vinyl benzoate, cyclohexyl methacrylate, benzyl methacrylate, phenyl(meth)acrylate, vinyl methoxy acetate, vinyl benzoate, ethyl α-ethoxy acrylate, alkyl (meth)acrylates having an alkyl group having 1 to 50 carbon atoms [e.g., methyl(meth)acrylate, ethyl (meth)acrylate, propyl(meth)acrylate, butyl(meth)acrylate, 2-ethylhexyl(meth)acrylate, dodecyl(meth)acrylate, hexadecyl(meth)acrylate, heptadecyl(meth)acrylate, octadecyl (meth)acrylate, eicosyl(meth)acrylate, behenyl(meth)acrylate], dialkyl fumarates (wherein the two alkyl groups are straight-chain, branched, or alicyclic groups having 2 to 8 carbon atoms), dialkyl maleates (wherein the two alkyl groups are straight-chain, branched, or alicyclic groups having 2 to 8 carbon atoms), poly(meth)allyloxyalkanes [e.g., diallyloxyethane, triallyloxyethane, tetraallyloxyethane, tetraallyloxypropane, tetraallyloxybutane, tetramethallyloxyethanel, vinyl monomers having a polyalkylene glycol chain ] e.g., polyethylene glycol (molecular weight: 300) mono(meth)acrylates, polypropylene glycol (molecular weight: 500) monoacrylates, methyl alcohol ethylene oxide 10 mol adduct of (meth)acrylate, lauryl alcohol ethylene oxide 30 mol adduct of (meth)acrylate], and poly(meth) acrylates [e.g., poly(meth)acrylates of polyols, ethylene glycol di(meth)acrylate, propylene glycol di(meth)acrylate, neopentyl glycol di(meth)acrylate, trimethylolpropane tri (meth)acrylate, polyethylene glycol di(meth)acrylate].

Examples of the vinyl (thio) ethers include, but are not limited to, vinyl methyl ether.

Examples of the vinyl ketones include, but are not limited to, vinyl methyl ketone.

(10) Other Vinyl Monomers Examples of other vinyl monomers include, but are not limited to, tetrafluoroethylene, fluoroacrylate, isocyanatoethyl(meth)acrylate, and m-isopropenyl-α,α-dimethylbenzyl isocyanate.

In the synthesis of the resin (b1), each of the above vinyl monomers (1) to (10) may be used alone or in combination with others.

For low-temperature fixability, the resin (b1) is preferably a styrene-(meth)acrylate copolymer or a (meth)acrylate copolymer, more preferably a styrene-(meth)acrylate copolymer.

When the resin (b1) has a carboxylic acid group, the resin is imparted with an acid value, and it is easy to form toner particles having the resin particles (B) adhered to the surfaces thereof.

Examples of the vinyl monomers used for the resin (b2) include the same vinyl monomers as those used for the resin (b1).

In the synthesis of the resin (b2), each of the vinyl monomers (1) to (10) described above for the resin (b1) may be used alone or in combination with others.

For low-temperature fixability, the resin (b2) is preferably a styrene-(meth)acrylate copolymer or a (meth)acrylate copolymer, more preferably a styrene-(meth)acrylate copolymer.

As a viscoelastic property, the resin (b1) preferably has a loss elastic modulus G" of from 1.5 to 100 MPa, more preferably from 1.7 to 30 MPa, and even more preferably from 2.0 to 10 MPa, at 100° C., and a frequency of 1 Hz.

As a viscoelastic property, the resin (b2) preferably has a loss elastic modulus G" of from 0.01 to 1.0 MPa, more preferably from 0.02 to 0.5 MPa, and even more preferably from 0.05 to 0.3 MPa, at 100° C., and a frequency of 1 Hz.

When the loss elastic modulus G" is within the above-described range, it is easy to form toner particles having the resin particles (B) adhered to their surfaces, where each of the resin particles (B) containing both the resin (b1) and the resin (b2) as constituent components.

The loss elastic modulus G" of each of the resin (b1) and the resin (b2) at 100° C., and a frequency of 1 Hz can be adjusted by changing the types of constituent monomers and the constituent ratio thereof or the polymerization conditions (e.g., types and amounts of initiators and chain transfer agents, reaction temperature).

Specifically, for example, G" can be adjusted to the above-described range under the following conditions.

(1) Adjusting a glass transition temperature (Tg1) calculated from the constituent monomers of the resin (b1) to preferably from 0° C. to 150° C., more preferably from 50° C. to 100° C.; and a glass transition temperature (Tg2) calculated from the constituent monomers of the resin (b2) to preferably from −30° C. to 100° C., more preferably from 0° C. to 80° C., and most preferably from 30° C. to 60° C.

Here, the glass transition temperature (Tg) is calculated from the constituent monomers based on the Fox method.

The Fox method (T. G. Fox, Phys. Rev., 86, 652 (1952)) is a method of estimating a Tg of a copolymer from a Tg of each homopolymer as represented by the following formula:

$$1/Tg=W1/Tg1+W2/Tg2+\ldots+Wn/Tgn$$

where Tg represents a glass transition temperature (expressed by absolute temperature) of a copolymer; Tg1, Tg2, . . . , and Tgn represent glass transition temperatures (expressed by absolute temperature) of homopolymers of the respective monomer components, and W1. W2, . . . , and Wn represent weight fractions of the respective monomer components.

(2) Adjusting a calculated acid value (AV1) of the resin (b1) to preferably from 75 to 400 mgKOH/g, more preferably from 150 to 300 mgKOH/g; and a calculated acid value (AV2) of the resin (b2) to preferably from 0 to 50 mgKOH/g, more preferably from 0 to 20 mgKOH/g, and most preferably 0 mgKOH/g.

Here, the calculated acid value is a theoretical acid value calculated from the molar amount of acidic groups contained in the constituent monomers and the total weight of the constituent monomers.

Examples of the resin (b1) satisfying the conditions (1) and (2) include resins containing, as constituent monomers, styrene in an amount of preferably from 10% to 80% by mass, more preferably from 30% to 60% by mass, and methacrylic acid and/or acrylic acid in an amount of preferably from 10% to 60% by mass, more preferably from 30% to 50% by mass, based on the total mass of the resin (b1).

Examples of the resin (b2) satisfying the conditions (1) and (2) include resins containing, as constituent monomers, styrene in an amount of preferably from 10% to 100% by mass, more preferably from 30% to 90% by mass, and methacrylic acid and/or acrylic acid in an amount of preferably from 0% to 7.5% by mass, more preferably from 0% to 2.5% by mass, based on the total mass of the resin (b2).

(3) Adjusting the polymerization conditions (e.g., types and amounts of initiators and chain transfer agents, reaction temperature). Specifically, adjusting a number average molecular weight (Mn1) of the resin (b1) to preferably from 2,000 to 2,000,000, more preferably from 20,000 to 200,000, and a number average molecular weight (Mn2) of the resin (b2) to preferably from 1,000 to 1,000,000, more preferably from 10,000 to 100,000.

In the present disclosure, the loss elastic modulus G" may be measured using the following rheometer.

Instrument: ARES-24A (product of Rheometric Scientific, Inc.)

Jig: 25 mm parallel plate

Frequency: 1 Hz

Distortion factor: 10%

Temperature rising rate: 5° C./min

The acid value (AVb1) of the resin (b1) is preferably from 75 to 400 mgKOH/g, and more preferably from 150 to 300 mgKOH/g.

When the acid value is within the above-described range, it is easy to form toner particles having the resin particles (B) adhered to their surfaces, where each of the resin particles (B) containing a vinyl unit containing both the resin (b1) and the resin (b2) as constituent components.

The resin (b1) having an acid value in this range are resins containing methacrylic acid and/or acrylic acid in an amount of preferably from 10% to 60% by mass, more preferably from 30% to 50% by mass, based on the total mass of the resin (b1).

The acid value (AVb2) of the resin (b2) is preferably from 0 to 50 mgKOH/g, more preferably from 0 to 20 mgKOH/g, and even more preferably 0 mgKOH/g, for low-temperature fixability.

The resin (b2) having an acid value in this range are resins containing methacrylic acid and/or acrylic acid in an amount of preferably from 0% to 7.5% by mass, more preferably from 0% to 2.5% by mass, based on the total mass of the resin (b2).

In the present disclosure, the acid value is measured based on a method according to Japanese Industrial Standards (JIS) K0070:1992.

The glass transition temperature of the resin (b1) is preferably higher, more preferably higher by 10° C. or more, and even more preferably higher by 20° C. or more, than the glass transition temperature of the resin (b2).

When the glass transition temperature in this range, toner particles having the resin particles (B) on their surfaces are in excellent balance between low-temperature fixability and the ease of formation of the toner particles.

The glass transition temperature (hereinafter "Tg") of the resin (b1) is preferably from 0° C. to 150° C., more preferably from 50° C. to 100° C.

When the glass transition temperature is 0° C. or higher, heat-resistant storage stability is improved. When the glass transition temperature is 150° C. or lower, there are few adverse effects on low-temperature fixability.

The Tg of the resin (b2) is preferably from −30° C. to 100° C., more preferably from 0° C. to 80° C., and still more preferably from 30° C. to 60° C. When the glass transition temperature is −30° C. or higher, heat-resistant storage stability is improved. When the glass transition temperature is 100° C. or lower, there are few adverse effects on low-temperature fixability.

In the present disclosure, Tg is measured by a method prescribed in ASTM D3418-82 (i.e., differential scanning calorimetry (DSC)) using an instrument DSC20, SSC/580 (product of Seiko Instruments & Electronics Ltd.).

The solubility parameter ("SP") of the resin (b1) is preferably from 9 to 13 $(cal/cm^3)^{1/2}$, more preferably from 9.5 to 12.5 $(cal/cm^3)^{1/2}$, and even more preferably from 10.5 to 11.5 $(cal/cm^3)^{1/2}$, for the ease of formation of toner particles.

The SP of the resin (b1) can be adjusted by changing the types of constituent monomers and the constituent ratio thereof.

The SP of the resin (b2) is preferably from 8.5 to 12.5 $(cal/cm^3)^{1/2}$, more preferably from 9 to 12 $(cal/cm^3)^{1/2}$, and even more preferably from 10 to 11 $(cal/cm^3)^{1/2}$, for the ease of formation of toner particles.

The SP of the resin (b2) can be adjusted by changing the types of constituent monomers and the constituent ratio thereof.

In the present disclosure, the SP is calculated based on the Fedors' method (Polym. Eng. Sci., 14 (2), 152, (1974)).

Preferably, the resin (b1) contains, as a constituent monomer, styrene in an amount of preferably from 10% to 80% by mass, more preferably from 30% to 60% by mass, based on the total mass of the resin (b1), in view of the Tg of the resin (b1) and copolymerizability with other monomers.

Preferably, the resin (b2) contains, as a constituent monomer, styrene in an amount of preferably from 10% to 100% by mass, more preferably from 30% to 90% by mass, based on the total mass of the resin (b2), in view of the Tg of the resin (b2) and copolymerizability with other vinyl monomers.

The number average molecular weight (Mn) of the resin (b1) is preferably from 2,000 to 2,000,000, and more preferably from 20,000 to 200.000. When the number average molecular weight is 2,000 or more, heat-resistant storage stability is improved. When the number average molecular weight is 2,000,00) or less, there are few adverse effects on low-temperature fixability of the toner.

The weight average molecular weight of the resin (b1) is preferably greater, more preferably at least 1.5 times greater, and even more preferably at least 2.0 times greater, than the weight average molecular weight of the resin (b2). With the weight average molecular weight in this range, the balance between low-temperature fixability and the ease of formation of toner particles is excellent.

The weight average molecular weight (Mw) of the resin (b1) is preferably from 20,000 to 20,000,000, and more preferably from 200,000 to 2,000,000. When the weight average molecular weight is 20,000 or more, heat-resistant storage stability is improved. When the weight average molecular weight is 20,000,000 or less, there are few adverse effects on low-temperature fixability.

The Mn of the resin (b2) is preferably from 1.000 to 1,000.000, and more preferably from 10,000 to 100,000. When the Mn is 1,000 or more, heat-resistant storage stability is improved. When the Mn is 1,000,000 or less, there are few adverse effects on low-temperature fixability of the toner.

The Mw of the resin (b2) is preferably from 10,000 to 10,000,000, and more preferably from 100,000 to 1,000,000. When the Mw is 10,000 or more, heat-resistant storage stability is improved. When the Mw is 10,000,000 or less, there are few adverse effects on low-temperature fixability of the toner.

In particular, it is preferable that the Mw of the resin (b1) be from 200,000 to 2,000,000, the Mw of the resin (b2) be from 100,000 to 500,000, and the relation "Mw of resin (b1)">"Mw of resin (b2)" be satisfied.

In the present disclosure, the Mn and Mw can be measured by gel permeation chromatography (GPC) under the following conditions.

Instrument: HLC-8120 (product of Tosoh Corporation)

Columns: TSK GEL GMH6 (product of Tosoh Corporation)×2

Measurement temperature: 40° C.

Sample solution: 0.25% by weight tetrahydrofuran solution (from which insoluble matter has been filtered off with a glass filter)

Solution injection amount: 100 μl

Detector: Refractive index detector

Reference materials: Standard polystyrene (TSKstandard POLYSTYRENE)×12 points (molecular weights: 500, 1,050, 2,800, 5,970, 9,100, 18,100, 37,900, 96,400, 190.000, 355,000, 1,090,000, and 2,890,000; product of Tosoh Corporation)

The weight ratio of the resin (b1) to the resin (b2) in the resin particles (B) is preferably from 5/95 to 95/5, more preferably from 25/75 to 75/25, and even more preferably from 40/60 to 60/40. When the weight ratio of the resin (b1) to the resin (b2) is 5/95 or more, heat-resistant storage stability of the toner is excellent. When the weight ratio of the resin (b1) to the resin (b2) is 95/5 or less, it is easy to form toner particles having the resin particles (B) adhered to their surfaces.

The resin particles (B) may be produced by known production methods. Examples thereof include, but are not limited to, the following production methods (I) to (V).

(I) A method in which constituent monomers of the resin (b2) are subjected to seed polymerization using fine particles of the resin (b1) in an aqueous dispersion as seeds.

(II) A method in which constituent monomers of the resin (b1) are subjected to seed polymerization using fine particles of the resin (b2) in an aqueous dispersion as seeds.

(III) A method in which a mixture of the resin (b1) and the resin (b2) is emulsified in an aqueous medium to obtain an aqueous dispersion of resin particles.

(IV) A method in which a mixture of constituent monomers of the resin (b1) and the resin (b2) is emulsified in an aqueous medium and then the constituent monomers of the resin (b2) are polymerized to obtain an aqueous dispersion of resin particles.

(IV) A method in which a mixture of constituent monomers of the resin (b2) and the resin (b1) is emulsified in an aqueous medium and then the constituent monomers of the resin (b1) are polymerized to obtain an aqueous dispersion of resin particles.

Whether each of the resin particles (B) contains both the shell resin (b1) and the core resin (b2) as constituent components can be confirmed by observing an elemental mapping image of a cut surface of the resin particles (B) using a known surface elemental analyzer (e.g., time-of-flight secondary ion mass spectrometer (TOF-SIMS), energy dispersive X-ray spectroscopic scanning electron microscope (EDX-SEM)), and by observing an electron-microscopic image of a cut surface of the resin particles (B) stained with a stain selected depending on the types of functional groups contained in the resin (b1) and the resin (b2).

The above-described methods may produce a mixture of: resin particles (B) each containing both the resin (b1) and the resin (b2) as constituent components; resin particles each containing only the resin (b1) as a constituent component; and resin particles each containing only the resin (b2) as a constituent component. In a complexing step (to be described later), the mixture may be used as it is, or only the resin particles (B) may be isolated and used.

Specific examples of the method (I) include, but are not limited to; a process in which constituent monomers of (b1) are subjected to dropwise polymerization to prepare an aqueous dispersion of resin particles containing (b1) and then constituent monomers of (b2) are subjected to seed polymerization using the aqueous dispersion as seeds; and a process in which (b1) prepared in advance by solution polymerization or the like is emulsified or dispersed in water and then constituent monomers of (b2) are subjected to seed polymerization using the emulsion or dispersion as seeds.

Specific examples of the method (I) include, but are not limited to; a process in which constituent monomers of (b2) are subjected to dropwise polymerization to prepare an aqueous dispersion of resin particles containing (b2) and then constituent monomers of (b1) are subjected to seed polymerization using the aqueous dispersion as seeds; and a process in which (b2) prepared in advance by solution polymerization or the like is emulsified or dispersed in water and then constituent monomers of (b1) are subjected to seed polymerization using the emulsion or dispersion as seeds.

Specific examples of the method (III) include, but are not limited to, a process in which solutions or melts of (b1) and (b2) prepared in advance by solution polymerization or the like are mixed and then emulsified or dispersed in an aqueous medium.

Specific examples of the method (IV) include, but are not limited to: a process in which (b1) prepared in advance by solution polymerization or the like is mixed with constituent monomers of (b2), the mixture is then emulsified or dispersed in an aqueous medium, and the constituent monomers of (b2) are polymerized; and a process in which (b1) is prepared in constituent monomers of (b2), the mixture is then emulsified or dispersed in an aqueous medium, and the constituent monomers of (b2) are polymerized.

Specific examples of the method (V) include, but are not limited to: a process in which (b2) prepared in advance by solution polymerization or the like is mixed with constituent monomers of (b1), the mixture is then emulsified or dispersed in an aqueous medium, and the constituent monomers of (b1) are polymerized; and a process in which (b2) is prepared in constituent monomers of (b1), the mixture is then emulsified or dispersed in an aqueous medium, and the constituent monomers of (b1) are polymerized.

In the present disclosure, any of the production methods (I) to (V) are suitable.

Preferably, the resin particles (B) are in the form of an aqueous dispersion.

The aqueous dispersion may contain water-soluble materials. The types of the water-soluble materials are not particularly limited and may be suitably selected to suit to a particular application. Examples thereof include, but are not limited to, a surfactant (D), a buffering agent, and a protective colloid. Each of these can be used alone or in combination with others.

The aqueous dispersion contains an aqueous medium. The type of the aqueous medium is not particularly limited as long as it is a liquid containing water as an essential component. Examples thereof include, but are not limited to, an aqueous solution.

Examples of the surfactant (D) include, but are not limited to, nonionic surfactants (D), anionic surfactants (D2), cationic surfactants (D3), amphoteric surfactants (D4), and other emulsifying and dispersing agents (D5).

Examples of the nonionic surfactants (D1) include, but are not limited to, AO (alkylene oxide)-adducted nonionic surfactants and polyol-based nonionic surfactants.

Examples of the AO-adducted nonionic surfactants include, but are not limited to, EO (ethylene oxide) adducts of aliphatic alcohols having 10 to 20 carbon atoms, EO adducts of phenol, EO adducts of nonylphenol, EO adducts of alkylamines having 8 to 22 carbon atoms, and EO adducts of poly(oxypropylene) glycol.

Examples of the polyol-based nonionic surfactants include, but are not limited to, fatty acid (C8-C24) esters of polyvalent (3 to 8 or more valences) alcohols (C2-C30) (e.g., glycerin monostearate, glycerin monooleate, sorbitan monolaurate, sorbitan monooleate), and alkyl (C4-C24) polyglycosides (degree of polymerization of 1 to 10).

Examples of the anionic surfactants (D2) include, but are not limited to, ether carboxylic acids having a hydrocarbon group having 8 to 24 carbon atoms or salts thereof, sulfates or ether sulfates having a hydrocarbon group having 8 to 24 carbon atoms and salts thereof, sulfonates having a hydrocarbon group having 8 to 24 carbon atoms, sulfosuccinates having one or two hydrocarbon groups having 8 to 24 carbon atoms, phosphates or ether phosphates having a hydrocarbon group having 8 to 24 carbon atoms and salts thereof, fatty acid salts having a hydrocarbon group having 8 to 24 carbon atoms, and acylated amino acid salts having a hydrocarbon group having 8 to 24 carbon atoms.

Examples of the ether carboxylic acids having a hydrocarbon group having 8 to 24 carbon atoms or salt thereof include, but are not limited to, sodium lauryl ether acetate and sodium (poly)oxyethylene (addition mole number of 1 to 100) lauryl ether acetate.

Examples of the sulfates or ether sulfates having a hydrocarbon group having 8 to 24 carbon atoms and salts thereof include, but are not limited to, sodium lauryl sulfate, sodium (poly)oxyethylene (addition mole number of 1 to 100) lauryl sulfate, triethanolamine (poly)oxyethylene (addition mole number of 1 to 100) lauryl sulfate, sodium (poly)oxyethylene (addition mole number of 1 to 100) coconut oil fatty acid monoethanolamide sulfate.

Examples of the sulfonates having a hydrocarbon group having 8 to 24 carbon atoms include, but are not limited to, sodium dodecylbenzenesulfonate.

Examples of the phosphates or ether phosphates having a hydrocarbon group having 8 to 24 carbon atoms and salts thereof include, but are not limited to, sodium lauryl phosphate and sodium (poly)oxyethylene (addition mole number of 1 to 100) laurvl ether phosphate.

Examples of the fatty acid salts having a hydrocarbon group having 8 to 24 carbon atoms include, but are not limited to, sodium laurate and triethanolamine laurate.

Examples of the acylated amino acid salts having a hydrocarbon group having 8 to 24 carbon atoms include, but are not limited to, sodium coconut oil fatty acid methyltaurine, sodium coconut oil fatty acid sarcosine, triethanolamine coconut oil fatty acid sarcosine, triethanolamine N-coconut oil fatty acid acyl-L-glutamate, sodium N-coconut oil fatty acid acyl-L-glutamate, and sodium lauroylmethyl-β-alanine.

Examples of the cationic surfactants (D3) include, but are not limited to, quaternary ammonium salts and amine salts.

Examples of the quaternary ammonium salts include, but are not limited to, stearyltrimethylammonium chloride, behenyltrimethylammonium chloride, distearyldimethylammonium chloride, and ethyl sulfate lanolin fatty acid aminopropylethyldimethylammonium.

Examples of the amine salts include, bur are not limited to, stearic acid diethylaminoethylamide lactate, dilaurylamine hydrochloride, and oleylamine lactate.

Examples of the amphoteric surfactants (D4) include, but are not limited to, betaine amphoteric surfactants and amino acid amphoteric surfactants.

Examples of the betaine amphoteric surfactants include, but are not limited to, coconut oil fatty acid amide propyldimethylaminoacetic acid betaine, lauryldimethylaminoacetic acid betaine, 2-alkyl-N-carboxymethyl-N-hydroxyethylimidazolinium betaine, and lauylhydroxysulfobetaine.

Examples of the amino acid amphoteric surfactants include, but are not limited to, sodium P-laurylaminopropionate.

Examples of the other emulsifying and dispersing agents (D5) include, but are not limited to, reactive activators.

The reactive activators are not particularly limited and may be suitably selected to suit to a particular application so long as they have radical reactivity. Examples thereof include, but are not limited to: ADEKA REASOAP (registered trademark) SE-10N, SR-10, SR-20, SR-30, ER-20, and ER-30 (products of ADEKA Corporation); AKUARON (registered trademark), HS-10, KH-05, KH-10, KH-1025 (products of DKS Co., Ltd.); ELEMINOL (registered trademark) JS-20 (product of Sanyo Chemical Industries, Ltd.); LATEMUL (registered trademark) D-104, PD-420, and PD-430 (products of Kao Corporation): TONET (registered trademark) MO-200 (product of Sanyo Chemical Industries, Ltd.); polyvinyl alcohols; starch and derivatives thereof: cellulose derivatives such as carboxymethyl cellulose, methyl cellulose, and hydroxyethyl cellulose: carboxyl-group-containing (co)polymers such as sodium polyacrylate; and emulsifying and dispersing agents having urethane group or ester group (e.g., those obtained by bonding a polycaprolactone polyol and a polyether diol with a polyisocyanate) described in U.S. Pat. No. 5,906,704.

For stabilizing oil droplets during emulsification and dispersion, acheiving a desired shape, and sharpening the particle size distribution, the surfactant (D) is preferably one of (D1), (D2), and (D5), or a combination thereof, more preferably a combination of (D1) and (D5) or a combination of (D2) and (D5).

Examples of the buffering agents include, but are not limited to, sodium acetate, sodium citrate, and sodium bicarbonate.

Examples of the protective colloids include, but are not limited to, water-soluble cellulose compounds and alkali metal salts of polymethacrylic acid.

The resin particles (B) may contain, in addition to the shell resin (b1) and the core resin (b2), other resin components, initiators (and residues thereof), chain transfer agents, antioxidants, plasticizers, preservatives, reducing agents, organic solvents, and the like.

Examples of the other resin components include, but are not limited to, vinyl resins other than those used for the shell resin (b1) and the core resin (b2), polyurethane resins, epoxy resins, polyester resins, polyamide resins, polyimide resins, silicon resins, phenol resins, melamine resins, urea resins, aniline resins, ionomer resins, and polycarbonate resins.

Examples of the initiators (and residues thereof) include known radical polymerization initiators. Specific examples thereof include, but are not limited to, persulfate initiators such as potassium persulfate and ammonium persulfate; azo initiators such as azobisisobutyronitrile; organic peroxides such as benzoyl peroxide, cumene hydroperoxide, tert-butyl hydroperoxide, tert-butyl peroxyisopropyl monocarbonate, and tert-butyl peroxybenzoate; and hydrogen peroxide.

Examples of the chain transfer agents include, but are not limited to, n-dodecyl mercaptan, tert-dodecyl mercaptan, n-butyl mercaptan, 2-ethylhexyl thioglycolate, 2-mercaptoethanol, 0-mercaptopropionic acid, and α-methylstyrene dimer.

Examples of the antioxidants include, but are not limited to, phenol compounds, paraphenylenediamine, hydroquinone, organic sulfur compounds, and organic phosphorus compounds.

Examples of the phenol compounds include, but are not limited to, 2,6-di-t-butyl-p-cresol, butylated hydroxyanisole, 2,6-di-t-butyl-4-ethylphenol, stearyl-β-(3,5-di-t-butyl-4-hydroxyphenyl)propionate, 2,2'-methylene-bis-(4-methyl-6-t-butylphenol), 2,2'-methylene-bis-(4-ethyl-6-t-butylphenol), 4,4'-thiobis-(3-methyl-6-t-butylphenol), 4,4'-butylidenebis-(3-methyl-6-t-butylphenol), 1,1,3-tris-(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl)propionatelmethane, bis[3,3'-bis(4'-hydroxy-3'-t-butylphenyl)butyric acid]glycol ester, and tocopherol.

Examples of the paraphenylenediamine include, but are not limited to, N-phenyl-N'-isopropyl-p-phenylenediamine, N,N'-di-sec-butyl-p-phenylenediamine, N-phenyl-N-sec-butyl-p-phenylenediamine, N,N'-di-isopropyl-p-phenylenediamine, and N,N'-dimethyl-N,N'-di-t-butyl-p-phenylenediamine.

Examples of the hydroquinone include, but are not limited to, 2,5-di-t-octylhydroquinone, 2,6-didodecylhydroquinone, 2-dodecylhydroquinone, 2-dodecyl-5-chlorohydroquinone, 2-t-octyl-5-methylhydroquinone, and 2-(2-octadecenyl)-5-methylhydroquinone.

Examples of the organic sulfur compounds include, but are not limited to, dilauryl-3,3'-thiodipropionate, distearyl-3,3'-thiodipropionate, and ditetradecyl-3,3'-thiodipropionate.

Examples of the organic phosphorus compounds include, but are not limited to, triphenylphosphine, tri(nonylphenyl) phosphine, tri(dinonylphenyl)phosphine, tricresylphosphine, and tri(2,4-dibutylphenoxy)phosphine.

Examples of the plasticizers include, but are not limited to, phthalates, aliphatic dibasic acid esters, trimellitates, phosphates, and fatty acid esters.

Examples of the phthalates include, but are not limited to, dibutyl phthalate, dioctyl phthalate, butyl benzyl phthalate, and diisodecyl phthalate.

Examples of the aliphatic dibasic acid esters include, but are not limited to, di-2-ethylhexyl adipate and 2-ethylhexyl sebacate.

Examples of the trimellitates include, but are not limited to, tri-2-ethylhexyl trimellitate and trioctyl trimellitate.

Examples of the phosphates include, but are not limited to, triethyl phosphate, tri-2-ethylhexyl phosphate, and tricresyl phosphate.

Examples of the fatty acid esters include, but are not limited to, butyl oleate.

Examples of the preservatives include, but are not limited to, organic nitrogen sulfur compound preservatives and organic sulfur halide preservatives.

Examples of the reducing agents include, but are not limited to, reducing organic compounds such as ascorbic acid, tartaric acid, citric acid, glucose, and formaldehyde sulfoxylate metal salts; and reducing inorganic compounds such as sodium thiosulfate, sodium sulfite, sodium bisulfite, and sodium metabisulfite.

Examples of the organic solvents include, but are not limited to, ketone solvents such as acetone and methyl ethyl ketone (MEK): ester solvents such as ethyl acetate and γ-butyrolactone; ether solvents such as tetrahydrofuran (THF): amide solvents such as N,N-dimethylformamide, N,N-dimethylacetamide, N-methyl-2-pyrrolidone, and N-methyl caprolactam; alcohol solvents such as isopropyl alcohol; and aromatic hydrocarbon solvents such as toluene and xylene.

The proportion of the resin particles in the toner is preferably from 0.2% to 5% by mass. When the total proportion of the resin (b1) and the resin (b2) is within this range, low-temperature fixability and heat-resistant storage stability are improved. When the proportion is 0.2% by mass or more, deterioration of heat-resistant storage stability is prevented. When the proportion is 5% by mass or less, deterioration of low-temperature fixability is prevented.

Toner Base Particles The toner base particles (also referred to as "toner base" or "base particles") contain a binder resin, a colorant, and a wax, and further contain other components as necessary.

Binder Resin

The binder resin is not particularly limited and can be suitably selected to suit to a particular application. Examples thereof include, but are not limited to, polyester resin, styrene-acrylic resin, polyol resin, vinyl resin, polyurethane resin, epoxy resin, polyamide resin, polyimide resin, silicon-based resin, phenol resin, melamine resin, urea resin, aniline resin, ionomer resin, and polycarbonate resin. Each of these can be used alone or in combination with others. Among these, polyester resin is preferred because it can impart flexibility to the toner.

Polyester Resin

The polyester resin is not particularly limited and can be suitably selected to suit to a particular application. Examples thereof include, but are not limited to, crystalline polyester resin, amorphous polyester resin, and modified polyester resin. Each of these can be used alone or in combination with others.

Amorphous Polyester Resin

The amorphous polyester resin (hereinafter also referred to as "amorphous polyester". "non-crystalline polyester", "non-crystalline polyester resin", "unmodified polyester resin", or "polyester resin component A") is not particularly limited and can be suitably selected to suit to a particular application. Examples thereof include, but are not limited to, an amorphous polyester resin obtained by a reaction between a polyol and a polycarboxylic acid.

In the present disclosure, the amorphous polyester resin refers to a resin obtained by a reaction between a polyol and a polycarboxylic acid, as described above. A polyester resin which has been modified, such as a prepolymer (described later) and a polyester resin obtained by cross-linking and/or elongating the prepolymer, is not included in the meaning of the amorphous polyester resin and treated as a modified polyester resin.

The amorphous polyester is a polyester resin component soluble in tetrahydrofuran (THF).

The amorphous polyester (polyester resin component A) is preferably a linear polyester resin.

Examples of the polyol include, but are not limited to, diols.

Specific examples of the diols include, but are not limited to: alkylene (C2-C3) oxide adducts of bisphenol A with an average addition molar number of 1 to 10, such as polyoxypropylene(2.2)-2,2-bis(4-hydroxyphenyl)propane and polyoxyethylene(2.2)-2,2-bis(4-hydroxyphenyl)propane; ethylene glycol and propylene glycol; and hydrogenated bisphenol A and alkylene (C2-C3) oxide adducts of hydrogenated bisphenol A with an average addition molar number of 1 to 10.

Each of these can be used alone or in combination with others.

In particular, the polyol preferably contains an alkylene glycol in an amount of 40% mol or more.

Examples of the polycarboxylic acid include, but are not limited to, dicarboxylic acids.

Specific examples of the dicarboxylic acids include, but are not limited to: adipic acid, phthalic acid, isophthalic acid, terephthalic acid, fumaric acid, and maleic acid; and succinic acid derivatives substituted with an alkyl group having 1 to 20 carbon atoms or an alkenyl group having 2 to 20 carbon atoms, such as dodecenyl succinic acid and octyl succinic acid.

Each of these can be used alone or in combination with others.

In particular, the polycarboxylic acid preferably contains terephthalic acid in an amount of 50% by mol or more.

The polyester resin component A may comprise, for the purpose of adjusting acid value and/or hydroxyl value, a trivalent or higher carboxylic acid, a trivalent or higher alcohol, and/or a trivalent or higher epoxy compound, on a terminal of the resin chain.

Among these, for suppressing unevenness and achieving sufficient gloss and image density, a trivalent or higher aliphatic alcohol is preferred.

Specific examples of the trivalent or higher carboxylic acid include, but are not limited to, trimellitic acid, pyromellitic acid, and acid anhydrides thereof.

Specific examples of the trivalent or higher alcohol include, but are not limited to, glycerin, pentaerythritol, and trimethylolpropane.

Molecular weight of the polyester resin component A is not particularly limited and can be suitably selected to suit to a particular application, but is preferably within the range described below.

The weight average molecular weight (Mw) of the polyester resin component A is preferably from 3,000 to 10,000, and more preferably from 4,000 to 7,000.

The number average molecular weight (Mn) of the polyester resin component A is preferably from 1,000 to 4,000, and more preferably from 1,500 to 3,000.

The molecular weight ratio (Mw/Mn) of Mw to Mn of the polyester resin component A is preferably from 1.0 to 4.0, and more preferably from 1.0 to 3.5.

The molecular weights can be measured by gel permeation chromatography (GPC).

The reason why the molecular weights are preferably in the above-described ranges is that, when the molecular weights are too low, heat-resistant storage stability and durability against stress (such as stirring in a developing device) of the toner may be poor, and when the molecular weights are too high, low-temperature fixability of the toner may be poor because viscoelasticity becomes too high when the toner melts. When the amount of components having a molecular weight of 600 or less is too large, heat-resistant storage stability and durability against stress such as stirring in a developing device of the toner may be poor. When the amount of components having a molecular weight of 600 or less is too small, low-temperature fixability may be poor.

Further, the proportion of THF-soluble matter having a molecular weight of 600 or less is preferably from 2% to 10% by mass.

This proportion may be adjusted by extracting the polyester resin component A with methanol to remove components having a molecular weight of 600 or less for purification.

The acid value of the polyester resin component A is not particularly limited and can be suitably selected to suit to a particular application, but is preferably from 1 to 50 mgKOH/g, more preferably from 5 to 30 mgKOH/g. When the acid value is 1 mgKOH/g or higher, the toner becomes more negatively-chargeable and more compatible with paper when being fixed thereon, thereby improving low-temperature fixability. When the acid value is 50 mgKOH/g or lower, a decrease of charge stability, particularly charge stability against environmental fluctuation, is prevented.

The hydroxyl value of the polyester resin component A is not particularly limited and can be suitably selected to suit to a particular application, but it is preferably 5 mgKOH/g or more.

The Tg of the polyester resin component A is preferably from 40° C. to 65° C., more preferably from 45° C. to 65° C., and even more preferably from 50° C. to 60° C. When the Tg is 40° C. or more, the toner is improved in heat-resistant storage stability, durability against stress such as stirring in a developing machine, and filming resistance. When the Tg is 65° C. or less, the toner well deforms by application of heat and pressure when being fixed, and low-temperature fixability is improved.

The content of the polyester resin component A is preferably from 80 to 90 parts by mass with respect to 100 parts by mass of the toner.

Modified Polyester The modified polyester resin (hereinafter also referred to as "modified polyester" or "polyester resin component C") is not particularly limited and can be suitably selected to suit to a particular application. Examples thereof include, but are not limited to, a reaction product of an active-hydrogen-group-containing compound and a polyester resin having a site reactive with the active-hydrogen-group-containing compound (hereinafter also referred to as "prepolymer" or "polyester prepolymer").

The modified polyester is a polyester resin insoluble in tetrahydrofuran (THF). The polyester resin component insoluble in tetrahydrofuran (THF) lowers Tg and melt viscosity of the toner while securing low-temperature fixability of the toner. On the other hand, the THF-insoluble polyester resin component has a branched structure in its molecular framework and thus the molecular chain thereof takes a three-dimensional network structure. Therefore, the THF-insoluble polyester resin component exhibits rubber-like property of being deformable but not flowable at low temperatures.

The polyester resin component C comprises the active-hydrogen-group-containing compound and the site reactive with the active-hydrogen-group-containing compound. The site behaves like a pseudo cross-linking point to enhance rubber-like properties of the amorphous polyester resin A, whereby a toner having excellent heat-resistant storage stability and high-temperature offset resistance can be produced.

Active-hydrogen-group-containing Compound

The active-hydrogen-group-containing compound is a compound that reacts with a polyester resin having a site reactive with the active-hydrogen-group-containing compound.

The active hydrogen group is not particularly limited and can be suitably selected to suit to a particular application. Examples thereof include, but are not limited to, hydroxyl group (e.g., alcoholic hydroxyl group, phenolic hydroxyl group), amino group, carboxyl group, and mercapto group. Each of these can be used alone or in combination with others.

The active-hydrogen-group-containing compound is not particularly limited and can be suitably selected to suit to a particular application. In a case in which the polyester resin having a site reactive with the active-hydrogen-group-containing compound is a polyester resin having an isocyanate group, an amine is preferably used as the active-hydrogen-group-containing compound because the amine is capable of making the molecular weight of the polyester resin higher through an elongation reaction or a cross-linking reaction.

The amine is not particularly limited and can be suitably selected to suit to a particular application. Examples thereof include, but are not limited to, diamines, trivalent or higher amines, amino alcohols, amino mercaptans, amino acids, and these amines in which the amino group is blocked. Each of these can be used alone or in combination with others.

In particular, a diamine alone and a mixture of a diamine with a small amount of a trivalent or higher amine are preferred.

The diamines are not particularly limited and can be suitably selected to suit to a particular application. Examples thereof include, but are not limited to, aromatic diamines, alicyclic diamines, and aliphatic diamines. The aromatic diamines are not particularly limited and can be suitably selected to suit to a particular application. Examples thereof include, but are not limited to, phenylenediamine, diethyltoluenediamine, and 4,4'-diaminodiphenylmethane. The alicyclic diamines are not particularly limited and can be suitably selected to suit to a particular application. Examples thereof include, but are not limited to, 4,4'-diamino-3,3'-dimethyldicyclohexylmethane, diaminocyclohexane, and isophoronediamine. The aliphatic diamines are not particularly limited and can be suitably selected to suit to a particular application. Examples thereof include, but are not limited to, ethylenediamine, tetramethylenediamine, and hexamethylenediamine.

The trivalent or higher amines are not particularly limited and can be suitably selected to suit to a particular application. Examples thereof include, but are not limited to, diethylenetriamine and triethylenetetramine.

The amino alcohols are not particularly limited and can be suitably selected to suit to a particular application. Examples thereof include, but are not limited to, ethanolamine and hydroxyethylaniline.

The amino mercaptans are not particularly limited and can be suitably selected to suit to a particular application. Examples thereof include, but are not limited to, aminoethyl mercaptan and aminopropyl mercaptan.

The amino acids are not particularly limited and can be suitably selected to suit to a particular application. Examples thereof include, but are not limited to, aminopropionic acid and aminocaproic acid.

The amines in which the amino group is blocked are not particularly limited and can be suitably selected to suit to a particular application. Examples thereof include, but are not limited to, ketimine compounds obtained by blocking the amino group with a ketone such as acetone, methyl ethyl ketone, and methyl isobutyl ketone, and oxazoline compounds.

Polyester Resin having site reactive with Active-hydrogen-group-containing Compound The polyester resin having a site reactive with the active-hydrogen-group-containing compound is not particularly limited and can be suitably selected to suit to a particular application. Examples thereof include, but are not limited to, a polyester resin having an isocyanate group (hereinafter also referred to as "polyester prepolymer having an isocyanate group"). The polyester resin having an isocyanate group is not particularly limited and can be suitably selected to suit to a particular application. Examples thereof include, but are not limited to, a reaction product of a polyester resin having an active hydrogen group, which is obtained by polycondensation of a polyol and a polycarboxylic acid, with a polyisocyanate.

The polyol is not particularly limited and can be suitably selected to suit to a particular application. Examples thereof include, but are not limited to, diols, trivalent or higher alcohols, and mixtures of diols with trivalent or higher alcohols. Each of these can be used alone or in combination with others.

Among these, a diol alone and a mixture of a diol with a small amount of a trivalent or higher alcohol are preferred.

The diols are not particularly limited and can be suitably selected to suit to a particular application. Examples thereof include, but are not limited to, chain alkylene glycols, diols having an oxyalkylene group, alicyclic diols, bisphenols, alkylene oxide adducts of alicyclic diols, and alkylene oxide adducts of bisphenols.

Specific examples of the chain alkylene glycols include, but are not limited to, ethylene glycol, 1,2-propylene glycol, 1,3-propylene glycol, 1,4-butanediol, and 1,6-hexanediol.

Specific examples of the diols having an oxyalkylene group include, but are not limited to, diethylene glycol, triethylene glycol, dipropylene glycol, polyethylene glycol, polypropylene glycol, and polytetramethylene glycol.

Specific examples of the alicyclic diols include, but are not limited to, 1,4-cyclohexanedimethanol and hydrogenated bisphenol A.

Specific examples of the bisphenols include, but are not limited to, bisphenol A, bisphenol F, and bisphenol S.

Specific examples of the alkylene oxide include, but are not limited to, ethylene oxide, propylene oxide, and butylene oxide.

The number of carbon atoms in the chain alkylene glycols is not particularly limited and can be suitably selected to suit to a particular application, but is preferably from 2 to 12.

Among these, chain alkylene glycols having 2 to 12 carbon atoms and alkylene oxide adducts of bisphenols are preferred; and alkylene oxide adducts of bisphenols, and mixtures of alkylene oxide adducts of bisphenols with chain alkylene glycols having 2 to 12 carbon atoms are more preferred.

The trivalent or higher alcohol is not particularly limited and can be suitably selected to suit to a particular application. Examples thereof include, but are not limited to, trivalent or higher aliphatic alcohols, trivalent or higher polyphenols, and alkylene oxide adducts of trivalent or higher polyphenols.

The trivalent or higher aliphatic alcohols are not particularly limited and can be suitably selected to suit to a particular application. Examples thereof include, but are not limited to, glycerin, trimethylolethane, trimethylolpropane, pentaerythritol, and sorbitol.

The trivalent or higher polyphenols are not particularly limited and can be suitably selected to suit to a particular application. Examples thereof include, but are not limited to, trisphenol PA, phenol novolac, and cresol novolac.

Examples of the alkylene oxide adducts of trivalent or higher polyphenols include, but are not limited to, alkylene oxide (e.g., ethylene oxide, propylene oxide, butylene oxide) adducts of trivalent or higher polyphenols.

In a case in which the diol and the trivalent or higher alcohol are used in combination, the mass ratio (trivalent or higher alcohol/diol) of the trivalent or higher alcohol to the diol is not particularly limited and can be suitably selected to suit to a particular application, but is preferably from 0.01% to 10% by mass, and more preferably from 0.01% to 1% by mass.

The polycarboxylic acid is not particularly limited and can be suitably selected to suit to a particular application. Examples thereof include, but are not limited to, dicarboxylic acids, trivalent or higher carboxylic acids, and mixtures of dicarboxylic acids with trivalent or higher carboxylic acids. Each of these can be used alone or in combination with others.

Among these, a dicarboxylic acid alone and a mixture of a dicarboxylic acid with a small amount of a trivalent or higher polycarboxylic acid are preferred.

The dicarboxylic acids are not particularly limited and can be suitably selected to suit to a particular application. Examples thereof include, but are not limited to, divalent alkanoic acids, divalent alkenoic acids, and aromatic dicarboxylic acids.

The divalent alkanoic acids are not particularly limited and can be suitably selected to suit to a particular application. Examples thereof include, but are not limited to, succinic acid, adipic acid, and sebacic acid.

The divalent alkenoic acids are not particularly limited and can be suitably selected to suit to a particular application. Preferred examples thereof include, but are not limited to, divalent alkenoic acids having 4 to 20 carbon atoms. The divalent alkenoic acids having 4 to carbon atoms are not particularly limited and can be suitably selected to suit to a particular application. Examples thereof include, but are not limited to, maleic acid and fumaric acid.

The aromatic dicarboxylic acids are not particularly limited and can be suitably selected to suit to a particular application. Preferred examples thereof include, but are not limited to, aromatic dicarboxylic acids having 8 to 20 carbon atoms. The aromatic dicarboxylic acids having 8 to 20 carbon atoms are not particularly limited and can be suitably selected to suit to a particular application. Examples thereof include, but are not limited to, phthalic acid, isophthalic acid, terephthalic acid, and naphthalenedicarboxylic acid.

The trivalent or higher carboxylic acids are not particularly limited and can be suitably selected to suit to a particular application. Examples thereof include, but are not limited to, trivalent or higher aromatic carboxylic acids.

The trivalent or higher aromatic carboxylic acids are not particularly limited and can be suitably selected to suit to a particular application. Preferred examples thereof include, but are not limited to, trivalent or higher aromatic carboxylic acids having 9 to 20 carbon atoms. The trivalent or higher aromatic carboxylic acids having 9 to 20 carbon atoms are not particularly limited and can be suitably selected to suit to a particular application. Examples thereof include, but are not limited to, trimellitic acid and pyromellitic acid.

Examples of the polycarboxylic acid further include acid anhydrides and lower alkyl esters of the dicarboxylic acids, the trivalent or higher carboxylic acids, and mixtures of the dicarboxylic acids with the trivalent or higher carboxylic acids.

The lower alkyl esters are not particularly limited and can be suitably selected to suit to a particular application. Examples thereof include, but are not limited to, methyl ester, ethyl ester, and isopropyl ester In a case in which the dicarboxylic acid and the trivalent or higher carboxylic acid are used in combination, the mass ratio (trivalent or higher carboxylic acid/dicarboxylic acid) of the trivalent or higher carboxylic acid to the dicarboxylic acid is not particularly limited and can be suitably selected to suit to a particular application, but is preferably from 0.01% to 10% by mass, and more preferably from 0.01% to 1% by mass.

At a polycondensation between the polyol and the polycarboxylic acid, the equivalent ratio (hydroxyl groups in the polyol/carboxyl groups in the polycarboxylic acid) of hydroxyl groups in the polyol to carboxyl groups in the polycarboxylic acid is not particularly limited and can be suitably selected to suit to a particular application, but is preferably from 1 to 2, more preferably from 1 to 1.5, and particularly preferably from 1.02 to 1.3.

The proportion of polyol-derived structural units in the polyester prepolymer having an isocyanate group is not particularly limited and can be suitably selected to suit to a particular application, but is preferably from 0.5% to 40% by mass, more preferably from 1% to 30% by mass, and particularly preferably from 2% to 20% by mass.

When the proportion is less than 0.5% by mass, hot offset resistance may deteriorate, and it may become difficult to achieve both heat-resistant storage stability and low-temperature fixability of the toner at the same time. When the proportion is more than 40% by mass, low-temperature fixability may deteriorate.

The polyisocyanate is not particularly limited and can be suitably selected to suit to a particular application. Examples thereof include, but are not limited to, aliphatic diisocyanates, alicyclic diisocyanates, aromatic diisocyanates, araliphatic diisocyanates, isocyanurates, and any of these polyisocyanates blocked with phenol derivatives, oxime, or caprolactam.

The aliphatic diisocyanates are not particularly limited and can be suitably selected to suit to a particular application. Examples thereof include, but are not limited to, tetramethylene diisocyanate, hexamethylene diisocyanate, methyl 2.6-diisocyanatocaproate, octamethylene diisocyanate, decamethylene diisocyanate, dodecamethylene diisocyanate, tetradecamethylene diisocyanate, trimethylhexane diisocyanate, and tetramethylhexane diisocyanate.

The alicyclic diisocyanates are not particularly limited and can be suitably selected to suit to a particular application. Examples thereof include, but are not limited to, isophorone diisocyanate and cyclohexylmethane diisocyanate.

The aromatic diisocyanates are not particularly limited and can be suitably selected to suit to a particular application. Examples thereof include, but are not limited to, tolylene diisocyanate, diisocyanatodiphenylmethane, 1,5-naphthylene diisocyanate, 4,4'-diisocyanatodiphenyl, 4,4'-diisocyanato-3,3'-dimethyldiphenyl, 4,4'-diisocyanato-3-methyldiphenylmethane, and 4,4'-diisocyanato-diphenyl ether.

The araliphatic diisocyanates are not particularly limited and can be suitably selected to suit to a particular application. Examples thereof include, but are not limited to, α,α,α',α'-tetramethylxylylene diisocyanate.

The isocyanurates are not particularly limited and can be suitably selected to suit to a particular application. Examples thereof include, but are not limited to, tris(isocyanatoalkyl) isocyanurate and tris(isocyanatocycloalkyl) isocyanurate. Each of these can be used alone or in combination with others.

In a case in which the polyisocyanate is reacted with a polyester resin having a hydroxyl group, the equivalent ratio (NCO/OH) of isocyanate groups in the polyisocyanate to hydroxyl groups in the polyester resin is not particularly limited and can be suitably selected to suit to a particular application, but is preferably from 1 to 5, more preferably from 1.2 to 4, and particularly preferably from 1.5 to 2.5. When the equivalent ratio is less than 1, hot offset resistance may deteriorate. When the equivalent ratio exceeds 5, low-temperature fixability may deteriorate.

The proportion of polyisocyanate-derived structural units in the polyester prepolymer having an isocyanate group is not particularly limited and can be suitably selected to suit to a particular application, but is preferably from 0.5% to 40% by mass, more preferably from 1% to 30% by mass, and particularly preferably from 2% to 20% by mass. When the proportion is less than 0.5% by mass, hot offset resistance may deteriorate. When the proportion exceeds 40% by mass, low-temperature fixability may deteriorate.

The average number of isocyanate groups included in one molecule of the polyester prepolymer having an isocyanate group is not particularly limited and can be suitably selected to suit to a particular application, but is preferably 1 or more, more preferably from 1.5 to 3, and particularly preferably from 1.8 to 2.5. When the average number is less than 1, the molecular weight of the modified polyester resin becomes low, and hot offset resistance may deteriorate.

The modified polyester resin can be produced by, for example, a one-shot method.

As an example, a method for producing a urea-modified polyester resin is described below.

First, a polyol and a polycarboxylic acid are heated to 150° C. to 280° C. in the presence of a catalyst such as tetrabutoxy titanate and dibutyltin oxide, and if necessarv, water generated is removed under reduced pressures to obtain a polyester resin having a hydroxyl group. Next, the polyester resin having a hydroxyl group is made to react with a polyisocyanate at 40° C. to 140° C. to obtain a polyester prepolymer having an isocyanate group. The polyester prepolymer having an isocyanate group is made to react with an amine at 0° C. to 140° C. to obtain a urea-modified polyester resin.

The number average molecular weight (Mn) of the modified polyester resin is not particularly limited and can be suitably selected to suit to a particular application, but is preferably from 1,000 to 10,000, more preferably from 1,500 to 6,000, as measured by gel permeation chromatography (GPC).

The weight average molecular weight of the modified polyester resin is not particularly limited and can be suitably selected to suit to a particular application, but is preferably from 20,000 to 1,000,000 as measured by gel permeation chromatography (GPC).

When the weight average molecular weight is 20,000 or more, heat-resistant storage stability does not deteriorate because the toner does not easily flows at low temperatures. In addition, high-temperature offset resistance does not deteriorate because the viscosity at the time of melting does not decrease.

When the polyester resin having a hydroxyl group is made to react with a polyisocyanate and when the polyester prepolymer having an isocyanate group is made to react with an amine, a solvent can be used if necessary.

The solvent is not particularly limited and can be suitably selected to suit to a particular application. Examples thereof include, but are not limited to, solvents which are inert to isocyanate groups, such as aromatic solvents, ketones, esters, amides, and ethers. Examples of the aromatic solvents include, but are not limited to, toluene and xylene. Examples of the ketones include, but are not limited to, acetone, methyl ethyl ketone, and methyl isobutyl ketone. Examples of the esters include, but are not limited to, ethyl acetate.

Examples of the amides include, but are not limited to, dimethylformamide and dimethylacetamide. Examples of the ethers include, but are not limited to, tetrahydrofuran.

The glass transition temperature of the modified polyester resin is preferably from−60° C. to 0° C., more preferably from −40° C. to −20° C.

When the glass transition temperature is −60° C. or higher, toner is prevented from flowing at low temperatures to prevent deterioration of heat-resistant storage stability and filming resistance.

When the glass transition temperature is 0° C. or lower, the toner can well deform by application of heat and pressure when being fixed, preventing deterioration of low-temperature fixability.

The content of the modified polyester is not particularly limited and can be suitably selected to suit to a particular application, but is preferably from 1 to 15 parts by mass, more preferably from 5 to 10 parts by mass, in 100 parts by mass of the toner.

The molecular structure of the polyester resin components A and C can be determined by, for example, solution or solid NMR (nuclear magnetic resonance). X-ray difTractometry, GC/MS (gas chromatography—mass spectroscopy), LC/MS (liquid chromatography—mass spectroscopy), or IR (infrared spectroscopy).

For example, IR can simply detect an amorphous polyester resin as a substance showing no absorption peak based on SCH (out-of-plane bending vibration) of olefin at %5±10 cm" and 990±10 cm" in an infrared absorption spectrum.

Crystalline Polyester The crystalline polyester resin (hereinafter also referred to as "crystalline polyester" or "polyester resin component D") is not particularly limited and can be suitably selected to suit to a particular application. Examples thereof include, but are not limited to, a crystalline polyester resin obtained by a reaction between a polyol and a polycarboxylic acid.

The crystalline polyester resin has a heat melting property such that the viscosity rapidly decreases at around the fixing start temperature due to its high crystallinity.

When used in combination with the amorphous polyester resin, the crystalline polyester resin can maintain good heat-resistant storage stability below the melting start temperature due to its crystallinity, but upon reaching the melting start temperature, the crystalline polyester resin melts and undergoes a rapid decrease in viscosity ("sharply-melting property"). The crystalline polyester resin then compatibilizes with the amorphous polyester resin and together undergoes a rapid decrease in viscosity to be fixed on a recording medium.

Thus, the toner exhibits excellent heat-resistant storage stability and low-temperature fixability. Such a toner also exhibits a wide releasable range (i.e., the difference between the lower-limit fixable temperature and the high-temperature offset generating temperature).

In the present disclosure, the crystalline polyester resin refers to a resin obtained by a reaction between a polyol and a polycarboxylic acid, as described above. A polyester resin which has been modified, such as the prepolymer described above and a polyester resin obtained by cross-linking and/or elongating the prepolymer, is not included in the meaning of the crystalline polyester resin.

Polyol The polyol is not particularly limited and can be suitably selected to suit to a particular application. Examples thereof include, but are not limited to, diols and trivalent or higher alcohols.

Examples of the diols include, but are not limited to, saturated aliphatic diols.

Examples of the saturated aliphatic diols include, but are not limited to, straight-chain saturated aliphatic diols and branched saturated aliphatic diols. Each of these can be used alone or in combination with others. Among these, for improving crystallinity and preventing a decrease of melting point, straight-chain saturated aliphatic diols are preferred, and straight-chain saturated aliphatic diols having 2 to 12 carbon atoms are more preferred.

Specific examples of the saturated aliphatic diols include, but are not limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanediol.

Among these diols, ethylene glycol, 1,4-butanediol, 1,6-hexanediol, 1,8-octanediol, 1,10-decanediol, and 1,12-dodecanediol are preferred for obtaining a crystalline polyester resin having high crystallinity and sharply-melting property.

Specific examples of the trivalent or higher alcohols include, but are not limited to, glycerin, trimethylolethane, trimethylolpropane, and pentaerythritol.

Polycarboxylic Acid The polycarboxylic acid is not particularly limited and can be suitably selected to suit to a particular application. Examples thereof include, but are not limited to, divalent carboxylic acids and trivalent or higher carboxylic acids.

Examples of the divalent carboxylic acids include, but are not limited to: saturated aliphatic dicarboxylic acids such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids such as diprotic acids such as phthalic acid, isophthalic acid, terephthalic acid, naphthalene-2,6-dicarboxylic acid, malonic acid, and mesaconic acid; and anhydrides and lower alkyl esters (C1-C3) thereof.

Examples of the trivalent or higher carboxylic acids include, but are not limited to, 1,2,4-benzenetricarboxylic acid, 1,2,5-benzenetricarboxylic acid, 1,2,4-naphthalenetricarboxylic acid, and anhydrides and lower alkyl esters (C1-C3) thereof.

The polycarboxylic acid may further include dicarboxylic acids having sulfo group, other than the above-described saturated aliphatic dicarboxylic acids and aromatic dicarboxylic acids. In addition, the polycarboxylic acid may further include dicarboxylic acids having double bonds, other than the above-described saturated aliphatic dicarboxylic acids and aromatic dicarboxylic acids.

Each of these may be used alone or in combination with others.

Preferably, the crystalline polyester resin comprises a straight-chain saturated aliphatic dicarboxylic acid having 4 to 12 carbon atoms and a straight-chain saturated aliphatic diol having 2 to 12 carbon atoms. In other words, preferably, the crystalline polyester resin has a structural unit derived from a saturated aliphatic dicarboxylic acid having 4 to 12 carbon atoms and another structural unit derived from a saturated aliphatic diol having 2 to 12 carbon atoms. Such a crystalline polyester resin has high crystallinity and sharply-melting property and thus exerts excellent low-temperature fixability, which is preferable.

Whether the crystalline polyester resin has crystallinity or not can be confirmed by a crystal analysis X-ray diffractometer (e.g., X'PERT PRO MRD, product of Koninklijke Philips N. V.). A measurement method is as follows.

First, a target sample is ground by a mortar to prepare a sample powder, and the obtained sample powder is uniformly applied to a sample holder. The sample holder is set in the diffractometer, and a measurement is performed to obtain a diffraction spectrum.

The sample is determined to have crystallinity when the half value width of the diffraction peak having the highest peak intensity, among the diffraction peaks observed in the range of $20° < 2\theta < 25°$, is 2.0 or less. In the present disclosure, a polyester resin which does not satisfy this condition is referred to as an amorphous polyester resin in contrast to the crystalline polyester resin.

Measurement conditions for X-ray diffractometry are as follows.

Measurement Conditions
Tension kV: 45 kV
Current: 40 mA
MPSS
Upper
Gonio
Scanmode: continuos
Start angle: 3°
End angle: 35°
Angle Step: 0.02°
Lucident beam optics
Divergence slit: Div slit 1/2
Diffraction beam optics
Anti scatter slit: As Fixed 1/2
Receiving slit: Prog rec slit The melting point of the crystalline polyester resin is not particularly limited and can be suitably selected to suit to a particular application, but is preferably from 60° C. to 80° C.

When the melting point is 60° C. or higher, the crystalline polyester resin is prevented from easily melting at low temperatures, thus preventing deterioration of heat-resistant storage stability of the toner. When the melting point is 80° C. or lower, the crystalline polyester resin is prevented from insufficiently melting when heated at the time of fixing the toner, thus preventing deterioration of low-temperature fixability.

The molecular weight of the crystalline polyester resin is not particularly limited and can be suitably selected to suit to a particular application.

Preferably, ortho-dichlorobenzene-soluble matter in the crystalline polyester resin has a weight average molecular weight (Mw) of from 3,000 to 30,000, more preferably from 5,000 to 15,000, as measured by GPC.

Preferably, ortho-dichlorobenzene-soluble matter in the crystalline polyester resin has a number average molecular weight (Mn) of from 1,000 to 10,000, more preferably from 2,000 to 10,000, as measured by GPC.

The molecular weight ratio (Mw/Mn) of Mw to Mn of the crystalline polyester resin is preferably from 1.0 to 10, more preferably from 1.0 to 5.0.

This is because, when the molecular weight distribution is sharp and the molecular weight is low, low-temperature fixability is excellent, and when the amount of low-molecular-weight components is large, heat-resistant storage stability is low.

The acid value of the crystalline polyester resin is not particularly limited and can be suitably selected to suit to a particular application, but is preferably 5 mgKOH/g or more, more preferably 10 mgKOH/g or more, for achieving a desired level of low-temperature fixability in terms of affinity for paper. On the other hand, for improving high-temperature offset resistance, the acid value is preferably 45 mgKOH/g or less.

The hydroxyl value of the crystalline polyester resin is not particularly limited and can be suitably selected to suit to a particular application, but is preferably from 0 to 50 mgKOH/g, more preferably from 5 to 50 mgKOH/g, for achieving a desired level of low-temperature fixability and a good level of chargeability.

The molecular structure of the crystalline polyester resin can be determined by, for example, solution or solid NMR (nuclear magnetic resonance), X-ray diffractometry, GC/MS (gas chromatography—mass spectroscopy), LC/MS (liquid chromatography—mass spectroscopy), or IR (infrared spectroscopy).

For example, IR can simply detect a crystalline polyester resin as a substance showing an absorption peak based on SCH (out-of-plane bending vibration) of olefin at 965±10 $cm^1$ or 990±10 $cm^{-1}$ in an infrared absorption spectrum.

The content of the crystalline polyester resin is not particularly limited and can be suitably selected to suit to a particular application, but is preferably from 4 to 12 parts by mass, more preferably from 5 to 11 parts by mass, in 100 parts by mass of the toner. When the content is 4 parts by mass or more, sharply-melting property of the crystalline polyester resin is sufficient and deterioration of low-temperature fixability is prevented. In addition, when the content is 12 parts by mass or less, deterioration of aggregation properties and adhesion properties at high temperatures is prevented.

Colorant

The colorant is not particularly limited and can be suitably selected to suit to a particular application. Specific examples thereof include, but are not limited to, carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSAYELLOW (GR, A, RN and R), Pigment Yellow L. BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G. Brilliant Fast Scarlet, Brilliant Carmine BS, PERMANENT RED (F2R. F4R, FRL, FRLL and F4RH), Fast Scarlet VD, VULCAN FAST RUBINE B, Brilliant Scarlet G, LITHOL RUBINE GX, Permanent Red F5R, Brilliant Carmine 6B, Pigment Scarlet 3B, Bordeaux 5B, Toluidine Maroon, PERMANENT BORDEAUX F2K, HELTO BORDEAUX BL, Bordeaux 10B, BON MAROON LIGHT, BON MAROON MEDIUM, Eosin Lake, Rhodanune Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC). Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, and lithopone.

The content of the colorant is not particularly limited and can be suitably selected to suit to a particular application, but is preferably from 1 to 15 parts by mass, more preferably from 3 to 10 parts by mass, in 100 parts by mass of the toner.

The colorant can be combined with a resin to be used as a master batch. Specific examples of the resin to be used for the master batch include, but are not limited to, the above-described other polyester resin, polymers of styrene or a derivative thereof (e.g., polystyrene, poly-p-chlorostyrene, polyvinyl toluene), styrene-based copolymers (e.g., styrene-p-chlorostyrene copolymer, styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl actylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ketone copolymer, styrene-butadiene copolymer, styrene-isoprene copolymer, styrene-acrylonitrile-indene copolymer, styrene-maleic acid copolymer, styrene-maleate copolymer), polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylic acid resin, rosin, modified rosin, terpene resin, aliphatic or alicyclic hydrocarbon resin, aromatic petroleum resin, chlorinated paraffin, and paraffin wax. Each of these can be used alone or in combination with others.

The master batch can be obtained by mixing and kneading the resin and the colorant while applying a high shearing force thereto. To increase the interaction between the colorant and the resin, an organic solvent may be used. More specifically, the maser batch can be obtained by a method called flushing in which an aqueous paste of the colorant is mixed and kneaded with the resin and the organic solvent so that the colorant is transferred to the resin side, followed by removal of the organic solvent and moisture. This method is advantageous in that the resulting wet cake of the colorant can be used as it is without being dried. Preferably, the mixing and kneading is performed by a high shearing dispersing device such as a three roll mill.

Wax

The wax (release agent) is not particularly limited and may be suitbaly selected from known waxes. Examples thereof include, but are not limited to, natural waxes and synthetic waxes. Each of these can be used alone or in combination with others.

Specific examples of the natural waxes include, but are not limited to: plant waxes such as camauba wax, cotton wax, sumac wax, and rice wax; animal waxes such as beeswax and lanolin; mineral waxes such as ozokerite and ceresin; and petroleum waxes such as paraffin, microcrystalline, and petrolatum.

Specific examples of the synthetic waxes include, but are not limited to: synthetic hydrocarbon waxes such as Fischer-Tropsch wax, polyethylene, and polypropylene: esters, ketones, and ethers; fatty acid amide compounds such as 12-hydroxystearic acid amide, stearic acid amide, phthalic anhydride imide, and chlorinated hydrocarbon; homopolymers and copolymers of polyacrylates (e.g., poly-n-stearyl methacrylate, poly-n-lauryl methacrylate), which are low-molecular-weight crystalline polymers, such as copolymer of n-stearyl acrylate and ethyl methacrylate; and crystalline polymers having a long alkyl side chain.

Among these, hydrocarbon waxes such as paraffin wax, micro-crystalline wax, Fischer-Tropsch wax, polyethylene wax, and polypropylene wax are preferred.

The melting point of the release agent is not particularly limited and can be suitably selected to suit to a particular application, but is preferably from 60° C. to 80° C. When the melting point is 60° C. or higher, deterioration of heat-resistant storage stability can be prevented because the release agent is unlikely to melt at low temperatures. When the melting point is 80° C. or lower, the release agent sufficiently melts in the fixable temperature range within which the resin melts, thus effectively preventing the occurrence of fixing offset and defective image.

The content of the release agent is not particularly limited and can be suitably selected to suit to a particular application, but is preferably from 2 to 10 parts by mass, more preferably from 3 to 8 parts by mass, in 100 parts by mass of the toner. When the content is 2 parts by mass or more, deterioration of high-temperature offset resistance and low-temperature fixability at the time of fixing can be prevented. When the content is 10 parts by mass or less, deterioration of heat-resistant storage stability and generation of image fogging can be prevented.

The toner base particles are not particularly limited as long as they can be used as ordinary toner base particles, and may contain other components suitably selected to suit to a particular application.

The content of the other components is not particularly limited and can be suitably selected to suit to a particular application as long as the properties of the toner are not impaired.

Other Components The other components are not particularly limited and can be suitably selected to suit to a particular application as long as they are usable for ordinary toners. Examples thereof include, but are not limited to, a charge controlling agent, an external additive, a fluidity improving agent, a cleanability improving agent, and a magnetic material.

Charge Controlling Agent The charge controlling agent is not particularly limited and can be suitably selected to suit to a particular application. Examples thereof include, but are not limited to, nigrosine dyes, triphenylmethane dyes, chromium-containing metal complex dyes, chelate pigments of molybdic acid, Rhodamine dyes, alkoxyamines, quaternary ammonium salts (including fluorine-modified quaternary ammonium salts), alkylamides, phosphorus and phosphorus-containing compounds, tungsten and tungsten-containing compounds, fluorine activators, metal salts of salicylic acid, and metal salts of salicylic acid derivatives.

Specific examples of commercially-available products of the charge controlling agent include, but are not limited to: BONTRON 03 (nigrosine dye). BONTRON P-51 (quaternary ammonium salt), BONTRON S-34 (metal-containing azo dye), BONTRON E-82 (metal complex of oxynaphthoic acid), BONTRON E-84 (metal complex of salicylic acid), and BONTRON E-89 (phenolic condensation product), products of Orient Chemical Industries Co., Ltd.; TP-302 and TP-415 (molybdenum complexes of quaternary ammonium salts), products of Hodogaya Chemical Co., Ltd.; and LRA-901 and LR-147 (boron complex), products of Japan Carlit Co., Ltd.

The content of the charge controlling agent is determined based on the type of the binder resin, the presence or absence of an additive used as necessary, and the toner manufacturing method (including dispersing method), and is not limited to any particular value. Preferably, the content of the charge controlling agent is from 0.1 to 10 parts by mass, more preferably from 0.2 to 5 parts by mass, based on 100 parts by mass of the binder resin.

When the content exceeds 10 parts by mass, chargeability of the toner becomes so large that the main effect of the charge controlling agent is reduced. As a result, the electrostatic attraction force between the toner and a developing roller is increased and the fluidity of the developer and the image density are lowered. The charge controlling agent may be melt-kneaded with the master batch or the binder resin and thereafter dissolved or dispersed in an organic solvent, or directly dissolved or dispersed in an organic solvent. Alternatively, the charge controlling agent may be fixed on the surface of the resulting toner particles.

Fluidity Improving Agent

The fluidity improving agent is not particularly limited and can be suitably selected to suit to a particular application as long as it reforms a surface to improve hydrophobicity for preventing deterioration of fluidity and chargeability even under high-humidity environments. Specific examples thereof include, but are not limited to, silane coupling agents, silylation agents, silane coupling agents having a fluorinated alkyl group, organic titanate coupling agents, aluminum coupling agents, silicone oils, and modified silicone oils.

Preferably, the above-described silica and titanium oxide are surface-treated with such a fluidity improving agent to become hydrophobic silica and hydrophobic titanium oxide, respectively.

Cleanability Improving Agent

The cleanability improving agent is not particularly limited and can be suitably selected to suit to a particular application as long as it is an additive that facilitates easy removal of the toner remaining on a photoconductor or primary transfer medium after image transfer. Specific examples thereof include, but are not limited to, metal salts of fatty acids (e.g., zinc stearate and calcium stearate) and fine particles of polymers prepared by soap-free emulsion polymerization (e.g., polymethyl methacrylate and polystyrene).

Preferably, the particle size distribution of the fine particles of polymers is as narrow as possible. More preferably, the volume average particle diameter thereof is in the range of from 0.01 to 1 μm.

Magnetic Material

The magnetic material is not particularly limited and can be suitably selected to suit to a particular application. Examples thereof include, but are not limited to, iron powder, magnetite, and ferrite. In particular, those having white color tone are preferred.

Preferably, the toner exhibits a glass transition temperature (Tg1 st) of from 40° C. to 65° C. in the first temperature rising in a differential scanning calorimetry (DSC).

Preferably, tetrahydrofuran (THF)-insoluble matter of the toner exhibits a glass transition temperature (Tg1st) of from −45° C. to 5° C. in the first temperature rising in the DSC.

Preferably, THF-soluble matter in the toner exhibits a glass transition temperature (Tg2nd) of from 20° C. to 65° C. measured in the second temperature rising in the DSC.

Preferably, the glass transition temperature (Tg1st) and the glass transition temperature (Tg2nd) of the toner in the first temperature rising and the second temperature rising, respectively, in the DSC satisfy Tg1st -Tg2nd>10 [° C.] for improving low-temperature fixability and heat-resistant storage stability.

The glass transition temperature of the toner can be measured using, for example, a differential scanning calorimeter (DSC-60, product of Shimadzu Corporation).

A DSC curve can be measured using the differential scanning calorimeter. The glass transition temperature (Tg1st) in the first temperature rising is determined, using an analysis program, by selecting the DSC curve obtained in the first temperature rising and analyzing it using the endothermic shoulder temperature in the analysis program. Similarly, the glass transition temperature (Tg2nd) in the second temperature rising is determined by selecting the DSC curve obtained in the second temperature rising and analyzing it using the endothermic shoulder temperature in the analysis program.

The storage elastic modulus G' at 70° C. of the toner is $4.0\times10^5$ or less, preferably $3.0\times10^5$Pa or less. When the storage elastic modulus G' exceeds $4.0\times10^5$, low-temperature fixability may deteriorate.

The storage elastic modulus G' at 70° C. of the toner indicates a storage elastic modulus in a temperature range within which low-temperature fixing is conducted, which has been required in recent years.

The method for measuring the storage elastic modulus G' at 70° C. of the toner is not particularly limited and can be suitably selected to suit to a particular application.

The average circularity of the toner is preferably from 0.965 to 0.985, and more preferably from 0.978 to 0.985. When the average circularity is 0.965 or more, the toner shape is not so irregular. Therefore, the toner is sufficiently covered with external additives, and cleanability is excellent even under high temperatures as well as under low-temperature and low-humidity environment. When the average circularity is 0.985 or less, the toner is well covered with external additives and can be well scraped off with a cleaning blade even under low-temperature and low-humidity environments as well as under high temperatures, preventing the occurrence of defective cleaning.

The method for measuring the average circularity of the toner is not particularly limited and can be suitably selected to suit to a particular application.

Developer A developer of the present disclosure comprises at least the toner of the present disclosure and optionally other components such as a carrier, as necessary. The developer may be either one-component developer or two-component developer. To be used for high-speed printers corresponding to recent improvement in information processing speed, two-component developer is preferable, because the lifespan of the printer can be extended.

Carrier The carrier is not particularly limited and can be suitably selected to suit to a particular application, but the carrier preferably comprises a core material and a resin layer that covers the core material.

Core Material

The core material is not particularly limited and can be suitably selected to suit to a particular application. Specific examples thereof include, but are not limited to, manganese-strontium materials having a magnetization of from 50 to 90 emu/g and manganese-magnesium materials having a magnetization of from 50 to 90 emu/g. For securing image density, high magnetization materials, such as iron powders having a magnetization of 100 emu/g or more and magnetites having a magnetization of from 75 to 120 emu/g, are preferred. Additionally, low magnetization materials, such as copper-zinc materials having a magnetization of from 30 to 80 emu/g, are preferred for improving image quality, because such materials are capable of reducing the impact of the magnetic brush of the developer to a photoconductor.

Each of these can be used alone or in combination with others.

The volume average particle diameter of the core material is not particularly limited and can be suitably selected to suit to a particular application, but is preferably from 10 to 150 μm, more preferably from 40 to 100 μm. When the volume average particle diameter is less than 10 μm, the amount of fine particles in the carrier is so large that the magnetization per carrier particle is lowered, causing carrier scattering. When the volume average particle diameter exceeds 150 μm, the specific surface area is so small that toner scattering may occur. Therefore, reproducibility of solid portions in full-color images may be lowered.

The toner of the present disclosure can be mixed with the carrier to become a two-component developer.

The content of the carrier in the two-component developer is not particularly limited and can be suitably selected to suit to a particular application, but is preferably from 90 to 98 parts by mass, more preferably from 93 to 97 parts by mass, based on 100 parts by mass of the two-component developer.

The developer can be used for various electrophotographic image forming methods such as magnetic one-component developing methods, non-magnetic one-component developing methods, and two-component developing methods.

Method for Manufacturing Toner

A method for manufacturing toner of the present disclosure is a method for manufacturing the above-described toner.

The method for manufacturing toner includes a composite particle forming step and a removing step, and further includes other steps as necessary.

Composite Particle Forming Step

The composite particle forming step is a step of adhering resin particles to surfaces of toner base particles to form composite particles.

The composite particles may be formed by a known dissolution suspension method in which an oil phase containing components of the toner base particles, such as the binder resin, colorant, and wax, is dispersed in an aqueous medium containing the resin particles.

As an example of the dissolution suspension method, described below is a method for forming composite particles while forming a polyester resin by an elongation reaction and/or a cross-linking reaction between the prepolymer and the curing agent.

This method involves the processes of preparation of an aqueous phase, preparation of an oil phase containing materials of the toner base particles, emulsification or dispersion of materials of the toner base particles, and removal of an organic solvent.

Preparation of Aqueous Phase

The aqueous phase may be prepared by dispersing resin particles in an aqueous medium. The amount of the resin particles dispersed in the aqueous medium is not particularly limited and can be suitably selected to suit to a particular application, but is preferably from 0.5 to 10 parts by mass based on 100 parts of the aqueous medium.

The aqueous medium is not particularly limited and can be suitably selected to suit to a particular application. Specific examples thereof include, but are not limited to, water, water-miscible solvents, and mixtures thereof. Each of these can be used alone or in combination with others. Among these, water is preferred.

The water-miscible solvent is not particularly limited and can be suitably selected to suit to a particular application. Specific examples thereof include, but are not limited to, alcohols, dimethylformamide, tetrahydrofuran, cellosolves, and lower ketones. Specific examples of the alcohols include, but are not limited to, methanol, isopropanol, and ethylene glycol. Specific examples of the lower ketones include, but are not limited to, acetone and methyl ethyl ketone.

Preparation of Oil Phase

The oil phase may be prepared by dissolving or dispersing materials of the toner base particles including the binder resin, colorant, and wax, and optionally a curing agent and the like, in an organic solvent.

The organic solvent is not particularly limited and can be suitably selected to suit to a particular application, but preferred is an organic solvent having a boiling point less than 150° C. that is easy to remove.

Specific examples of the organic solvent having a boiling point less than 150° C. include, but are not limited to, toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone.

Each of these can be used alone or in combination with others.

Among these solvents, ethyl acetate, toluene, xylene, benzene, methylene chloride, 1,2-dichloroethane, chloroform, and carbon tetrachloride are preferred, and ethyl acetate is most preferred.

Emulsification or Dispersion

Emulsification or dispersion of the toner materials is conducted by dispersing the oil phase containing the toner materials in the aqueous medium. At the time of emulsification or dispersion of the toner materials, the curing agent and the prepolymer may be subjected to an elongation reaction and/or a cross-linking reaction.

The reaction conditions (e.g., reaction time, reaction temperature) for forming the polyester resin are not particularly limited and can be suitably determined depending on the combination of the curing agent and the prepolymer. Preferably, the reaction time is from 10 minutes to 40 hours, more preferably from 2 to 24 hours. Preferably, the reaction temperature is from 0° C. to 150° C., more preferably from 40° C. to 98° C.

A method for forming a stable dispersion containing the prepolymer in the aqueous medium is not particularly limited and can be suitably selected to suit to a particular application. As an example, the dispersion can be prepared by dispersing the oil phase, in which the toner materials are dissolved or dispersed in a solvent, in the aqueous medium by a shear force.

A disperser used for the dispersing is not particularly limited and can be suitably selected to suit to a particular application. Examples of the disperser include, but are not limited to, low-speed shear dispersers, high-speed shear dispersers, friction dispersers, high-pressure jet dispersers, and ultrasonic dispersers. Among these dispersers, high-speed shear dispersers are preferred because they can adjust the particle diameter of the dispersoids (oil droplets) to 2 to 20 μm.

When the high-speed shear disperser is used, dispersing conditions, such as the rotation speed, dispersing time, and dispersing temperature, can be determined depending on the purpose. The rotation speed is preferably from 1,000 to 30,000 rpm, and more preferably from 5,000 to 20,000 rpm. The dispersing time is preferably from 0.1 to 5 minutes in the case of a batch-type disperser. The dispersing temperature is preferably from 0° C. to 150° C., more preferably from 40° C. to 98° C., under pressure. Generally, as the dispersing temperature becomes higher, the dispersing becomes easier.

The amount of the aqueous medium used to emulsify or disperse the toner materials is not particularly limited and can be suitably selected to suit to a particular application, but is preferably from 50 to 2,000 parts by mass, more preferably from 100 to 1,000 parts by mass, based on 100 parts by mass of the toner materials. When the used amount of the aqueous medium is less than 50 parts by mass, the dispersion state of the toner materials may be poor, and the resulting toner base particles cannot have a desired particle diameter. When the used amount of the aqueous medium exceeds 2,000 parts by mass, manufacturing cost may be increased.

Preferably, when emulsifying or dispersing the oil phase containing the toner materials, a dispersant is used to stabilize dispersoids (oil droplets) to obtain toner particles with a desired shape and a narrow particle size distribution.

The dispersant is not particularly limited and can be suitably selected to suit to a particular application. Specific examples thereof include, but are not limited to, surfactants, poorly-water-soluble inorganic compounds, and polymeric protective colloids. Each of these can be used alone or in combination with others. Among these, surfactants are preferred.

The surfactants are not particularly limited and can be suitably selected to suit to a particular application. Examples thereof include, but are not limited to, anionic surfactants, cationic surfactants, nonionic surfactants, and amphoteric surfactants. Specific examples of the anionic surfactants include, but are not limited to, alkylbenzene sulfonate, α-olefin sulfonate, and phosphate. Among these, those having a fluoroalkyl group are preferred.

Removal of Organic Solvent

A method for removing the organic solvent from the dispersion liquid such as an emulsion slurry is not particularly limited and can be suitably selected to suit to a particular application. For example, the method may include the process of gradually raising the temperature of the reaction system to completely evaporate the organic solvent from oil droplets, or spraying the dispersion liquid into dry atmosphere to completely evaporate the organic solvent from oil droplets.

Upon removal of the organic solvent, composite particles are formed.

Removing Step

The removing step is a step of removing at least part of the resin particles from the composite particles, preferably a step of removing part or all of the shell resin (resin (b1)) of the resin particles.

Specific examples of the step of removing at least part of the resin particles include washing the composite particles. Thus, the removing step can also be referred to as a washing step.

In the washing step, part or all of the resin (b1) may be removed by a chemical method.

The chemical method may include a step of washing the composite particles with a basic aqueous solution. Part or all of the shell resin (b1) can be dissolved by washing the composite particles with a basic aqueous solution.

By performing the washing step, the toner of the present disclosure is obtained.

The basic aqueous solution is not particularly limited and can be suitably selected to suit to a particular application as long as it is basic. Examples thereof include, but are not limited to, aqueous solutions of alkali metal hydroxides such as potassium hydroxide and sodium hydroxide, and ammonia. Each of these can be used alone or in combination with others.

Among these, potassium hydroxides and sodium hydroxides are preferred because they are easy to dissolve the shell resin (b1).

The pH of the basic aqueous solution is preferably from 8 to 14, and more preferably from 10 to 12.

The mixing of the composite particles and the basic aqueous solution in the washing step can be performed by adding the basic aqueous solution dropwise to the composite slurry under stirring.

After the basic aqueous solution is added dropwise, an acid aqueous solution may be added dropwise for neutralization.

Other Steps

The other steps are not particularly limited and can be suitably selected to suit to a particular application. Examples thereof include, but are not limited to, a drying step and a classification step.

The drying step is not particularly limited and can be suitably selected to suit to a particular application, as long as the solvent can be removed from the composite particles.

The classification step may be performed in a liquid by removing ultrafine particles by cyclone separation, decantation, or centrifugal separation. Alternatively, the classification operation may be performed after the drying.

The above-obtained composite particles may be further mixed with particles of the external additive, the charge controlling agent, or the like. By applying a mechanical impact in the mixing, the particles of the external additive, etc., are suppressed from releasing from the surface of the toner base particles.

A method for applying the mechanical impact is not particularly limited and can be suitably selected to suit to a particular application. For example, the method may be performed by using blades rotating at a high speed, or by accelerating the particles in a high-speed airflow to allow the particles collide with each other or with a collision plate.

An apparatus used for the above method is not particularly limited and can be suitably selected to suit to a particular application. Examples of usable apparatuses include, but are not limited to, ONG MILL (product of Hosokawa Micron Corporation), I-TYPE MILL (product of Nippon Pneumatic Mfg. Co., Ltd.) modified to reduce the pulverizing air pressure, HYBRIDIZATION SYSTEM (product of Nara Machinery Co., Ltd.), KRYPTON SYS- TEM (product of Kawasaki Heavy Industries, Ltd.), and an automatic mortar. Toner Accommodating Unit In the present disclosure, a toner accommodating unit refers to a unit having a function of accommodating toner and accommodating the toner. The toner accommodating unit may be in the form of, for example, a toner accommodating container, a developing device, or a process cartridge.

The toner accommodating container refers to a container accommodating the toner.

The developing device refers to a device that accommodates toner and is configured to develop an electrostatic latent image into a toner image with the toner.

The process cartridge refers to a combined body of an image bearer with a developing unit accommodating the toner, detachably mountable on an image forming apparatus. The process cartridge may further include at least one of a charger, an irradiator, and a cleaner.

A process cartridge of the present disclosure is illustrated in FIG. 1. As illustrated in FIG. 1, the process cartridge of the present embodiment includes a latent image bearer 101, a charger 102, a developing device 104, and a cleaner 107, and further includes other members as necessary. In FIG. 1, 103 denotes light emitted from an irradiator and 105 denotes a recording sheet.

The latent image bearer 101 may be the same as an electrostatic latent image bearer in an image forming apparatus described later. The charger 102 may be any type of charging member.

In the image forming process performed by the process cartridge illustrated in FIG. 1, an electrostatic latent image, corresponding to a light irradiation image, is formed on a surface of the latent image bearer 101 through charging by the charger 102 and irradiation with the light 103 by the irradiator while the latent image bearer 101 rotates in a direction indicated by arrow.

The electrostatic latent image is developed into a toner image by the developing device 104. The toner image is transferred onto the recording medium 105 by a transfer roller 108. The recording medium 105 having the toner image thereon is output as a print.

After the toner image has been transferred, the surface of the latent image bearer 101 is cleaned by the cleaner 107 and neutralized by a neutralizer. These operations are repeatedly performed.

Image Forming Apparatus and Image Forming Method An image forming apparatus of the present disclosure includes the above-described toner accommodating unit, an electrostatic latent image bearer, an electrostatic latent image forming device, and a developing device, and optionally other devices.

An image forming method of the present disclosure includes at least an electrostatic latent image forming process and a developing process, and optionally other processes.

Electrostatic Latent Image Bearer The electrostatic latent image bearer is not limited in material, structure, and size.

Specific examples of usable materials include, but are not limited to, inorganic photoconductors such as amorphous silicon and selenium, and organic photoconductors such as polysilane and phthalopolymethine. Among these materials, amorphous silicon is preferred for long operating life.

The linear speed of the electrostatic latent image bearer is preferably 300 mm/s or higher.

Electrostatic Latent Image Forming Device and Electrostatic Latent Image Forming Process The electrostatic latent image forming device is not particularly limited and can be suitably selected to suit to a particular application as long as it is capable of forming an electrostatic latent image on the electrostatic latent image bearer. For example, the electrostatic latent image forming device may include a charger to uniformly charge a surface of the electrostatic latent image bearer and an irradiator to irradiate the surface of the electrostatic latent image bearer with light containing image information.

The electrostatic latent image forming process is not particularly limited and can be suitably selected to suit to a particular application as long as an electrostatic latent image is formed on the electrostatic latent image bearer. For example, the electrostatic latent image forming process may include charging a surface of the electrostatic latent image bearer and irradiating the charged surface with light containing image information. The electrostatic latent image forming process can be performed by the electrostatic latent image forming device.

Charger and Charging Process

The charger is not particularly limited and can be suitably selected to suit to a particular application. Specific examples thereof include, but are not limited to, contact chargers equipped with a conductive or semiconductive roller, brush, film, or rubber blade, and non-contact chargers employing corona discharge such as corotron and scorotron.

The charging process may include applying a voltage to a surface of the electrostatic latent image bearer by the charger.

The shape of the charger is determined in accordance with the specification or configuration of the image forming apparatus, and may be in the form of a roller, a magnetic brush, a fur brush, etc.

The charger is not limited to the contact charger. However, the contact charger is preferred because the amount of by-product ozone is small.

Irradiator and Irradiation Process The irradiator is not particularly limited and can be suitably selected to suit to a particular application as long as it can irradiate the surface of the electrostatic latent image bearer charged by the charger with light containing information of an image to be formed.

Specific examples thereof include, but are not limited to, various irradiators of radiation optical system type, rod lens array type, laser optical type, and liquid crystal shutter optical type.

The light source used for the irradiator is not particularly limited and can be suitably selected to suit to a particular application. Specific examples thereof include, but are not limited to, luminescent matters such as fluorescent lamp, tungsten lamp, halogen lamp, mercury lamp, sodium lamp, light emitting diode (LED), laser diode (LD), and electroluminescence (EL).

For the purpose of emitting light having a desired wavelength only, any type of filter can be used, such as sharp cut filter, band pass filter, near infrared cut filter, dichroic filter, interference filter, and color-temperature conversion filter.

The irradiation process may include irradiating the surface of the electrostatic latent image bearer with light containing image information emitted from the irradiator.

The irradiation can also be conducted by irradiating the back surface of the electrostatic latent image bearer with light containing image information.

Developing Device and Developing Process

The developing device is not particularly limited and can be suitably selected to suit to a particular application as long as it accommodates the toner and develops the electrostatic latent image formed on the electrostatic latent image bearer with the toner to form a toner image (visible image).

The developing process is not particularly limited and can be suitably selected to suit to a particular application as long as the electrostatic latent image formed on the electrostatic latent image bearer is developed with the toner to form a toner image (visible image). The developing process may be performed by the developing device.

Preferably, the developing device includes a stirrer to frictionally stir and charge the toner, a magnetic field generator fixed inside the developing device, and a rotatable developer bearer to bear a developer containing the toner on its surface. Other Devices and Other Processes Examples of the other optional devices include, but are not limited to, a transfer device, a fixing device, a cleaner, a neutralizer, a recycler, and a controller.

Examples of the other optional processes include, but are not limited to, a transfer process, a fixing process, a cleaning process, a neutralization process, a recycle process, and a control process.

Transfer Device and Transfer Process

The transfer device is not particularly limited and can be suitably selected to suit to a particular application as long as it transfers the visible image onto a recording medium.

Preferably, the transfer device includes a primary transfer device to transfer the visible image onto an intermediate transfer medium to form a composite transfer image, and a secondary transfer device to transfer the composite transfer image onto a recording medium.

The transfer process is not particularly limited and can be suitably selected to suit to a particular application as long as the visible image is transferred onto a recording medium.

Preferably, the transfer process includes primarily transferring the visible image onto an intermediate transferor and secondarily transferring the visible image onto a recording medium.

In the transfer process, the visible image may be transferred by charging the electrostatic latent image bearer by a transfer charger. The transfer process can be performed by the transfer device.

When the image to be secondarily transferred onto the recording medium is a color image formed of multiple toners having different colors, each color toner is sequentially superimposed on one another on the intermediate transferor to form a composite image thereon and then the composite image on the intermediate transferor is secondarily transferred onto the recording medium at once.

The intermediate transferor is not particularly limited and can be suitably selected from among known transferors to suit to a particular application. Preferred examples thereof include, but are not limited to, a transfer belt, he transfer device (including the primary transfer device and the secondary transfer device) preferably includes a transferrer configured to separate the visible image formed on the electrostatic latent image bearer to the recording medium side by charging. Specific examples of the transferrer include, but are not limited to, a corona transferrer utilizing corona discharge, a transfer belt, a transfer roller, a pressure transfer roller, and an adhesive transferrer.

Although the recording medium is typically plain paper, it is not particularly limited and can be suitably selected to suit to a particular application as long as it is capable of transferring an unfixed developed image. For example, a PET (polyethylene terephthalate) base for use in overhead projector (OHP) can be used as the recording medium.

Fixing Process and Fixing Device The fixing device is not particularly limited and can be suitably selected to suit to a particular application as long as it is capable of fixing the transferred toner image on the recording medium. Preferred examples of the fixing device include known heat-pressure members. Specific examples of the heat-pressure members include, but are not limited to: a combination of a heat roller and a pressure roller; and a combination of a heat roller, a pressure roller, and an endless belt.

The fixing process is not particularly limited and can be suitably selected to suit to a particular application as long as it is a process of fixing the transferred toner image (visible image) on the recording medium. The fixing process may be performed either each time each toner image is transferred onto the recording medium or at once after all toner images are superimposed on one another.

The fixing process may be performed by the fixing device.

The heating temperature of the heat-pressure member is preferably from 80° C. to 200° C.

The fixing device may be used together with or replaced with an optical fixer according to the purpose.

In the fixing process, the fixing pressure is not particularly limited and can be suitably selected to suit to a particular application, but is preferably from 10 to 80 $N/cm^2$.

Cleaner and Cleaning Process The cleaner is not particularly limited and can be suitably selected to suit to a particular application as long as it is capable of removing residual toner particles remaining on the electrostatic latent image bearer. Specific examples thereof include, but are not limited to, a magnetic brush cleaner, an electrostatic brush cleaner, a magnetic roller cleaner, a blade cleaner, a brush cleaner, and a web cleaner.

The cleaning process is not particularly limited and can be suitably selected to suit to a particular application as long as residual toner particles remaining on the electrostatic latent image bearer are removed. The cleaning process can be performed by the cleaner.

Neutralizer and Neutralization Process The neutralizer is not particularly limited and can be suitably selected to suit to a particular application as long as it is capable of eliminate charge on the photoconductor by application of a neutralization bias thereto. Specific examples of the neutralizer include, but are not limited to, a neutralization lamp.

The neutralization process is not particularly limited and can be suitably selected to suit to a particular application as long as the photoconductor is neutralized by application of a neutralization bias thereto. The neutralization process can be performed by the neutralizer.

Recycler and Recycle Process

The recycler is not particularly limited and can be suitably selected to suit to a particular application as long as it is capable of making the developing device recycle the toner removed in the cleaning process. Specific examples of the recycler include, but are not limited to, a conveyer.

The recycle process is not particularly limited and can be suitably selected to suit to a particular application as long as the toner particles removed in the cleaning process are recycled by the developing device. The recycle process can be performed by the recycler.

An image forming apparatus of the present disclosure is described below with reference to FIG. 2. Although a printer is illustrated as an example of the image forming apparatus of the present embodiment, the image forming apparatus is not particularly limited thereto as long as it is capable of forming an image with toner, such as copiers, facsimile machines, and multifunction peripherals.

The image forming apparatus includes a sheet feeding unit 210, a conveying unit 220, an image forming unit 230, a transfer unit 240, and a fixing unit 250.

The sheet feeding unit 210 includes a sheet tray 211 in which sheets P are stacked, and a feed roller 212 that feeds the sheets P stacked in the sheet tray 211 one by one.

The conveying unit 220 includes: a roller 221 that conveys the sheet P fed by the feed roller 212 toward the transfer unit 240; a pair of timing rollers 222 that holds the leading edge of the sheet P conveyed by the roller 221 and feeds it to the transfer unit 240 at a predetermined timing; and an output roller 223 that ejects the sheet P having a fixed color toner image to an output tray 224.

Figure 2:
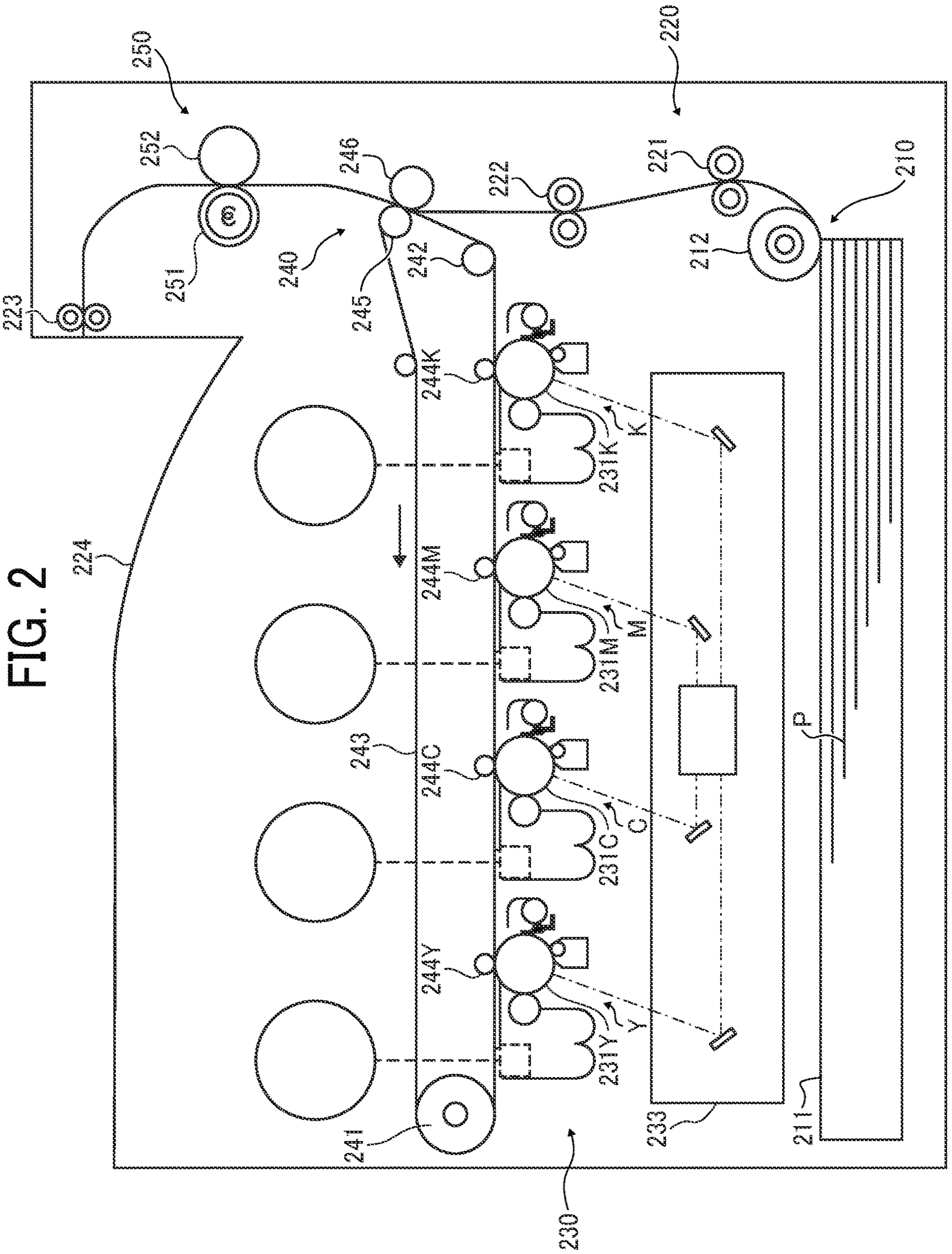
FIG. 2 is a schematic diagram of an image forming apparatus according to an embodiment of the present invention.

The image forming unit 230 includes: from left to right in FIG. 2 at predetermined intervals, an image forming unit Y that forms an image using a developer containing yellow toner, an image forming unit C that forms an image using a developer containing cyan toner, an image forming unit M that forms an image using a developer containing magenta toner, and an image forming unit K that forms an image using a developer containing black toner; and an irradiator 233.

Hereinafter, any of the image forming units Y, C, M, and K will be simply referred to as the image forming unit.

The developer contains a toner and a carrier. The four image forming units Y, C, M. and K have substantially the same mechanical configuration except that the developers contained therein are different.

The transfer unit 240 includes: a driving roller 241: a driven roller 242; an intermediate transfer belt 243 rotatable counterclockwise in FIG. 2 in accordance with driving of the driving roller 241; primary transfer rollers 244Y, 244C, 244M, and 244K disposed facing respective photoconductor drums 231Y, 231C, 231C, and 231K with the intermediate transfer belt 243 therebetween; and a secondary opposing roller 245 and a secondary transfer roller 246 disposed facing each other with the intermediate transfer belt 243 therebetween at a position where the toner image is transferred onto the sheet P.

The fixing unit 250 includes: a fixing belt 251 that contains a heater inside to heat the sheet P; and a pressure roller 252 rotatably pressed against the fixing belt 251 to forms a nip therebetween. The color toner image on the sheet P is applied with heat and pressure, and the color toner image is fixed. The sheet P on which the color toner image has been fixed is ejected onto the output tray 224 by the output roller 223, and a series of image forming processes is completed.

EXAMPLES

Further understanding can be obtained by reference to certain specific examples which are provided herein for the purpose of illustration only and are not intended to be limiting. In the following descriptions, "parts" represents "parts by mass" and "%" represents "% by mass" unless otherwise specified.

Example 1

Synthesis of Amorphous Polyester Resin A-1

A four-neck flask equipped with a nitrogen inlet tube, a dewatering tube, a stirrer, and a thermocouple was charged with ethylene oxide 2-mol adduct of bisphenol A ("BisA-EO") and propylene oxide 3-mol adduct of bisphenol A ("BisA-PO") at a molar ratio (BisA-EO/BisA-PO) of 85/15, terephthalic acid and adipic acid at a molar ratio (terephthalic acid/adipic acid) of 75/25, and trimethylolpropane (TMP) in an amount of 1% by mol (based on all the monomers), such that the molar ratio (OH/COOH) of hydroxyl groups to carboxyl groups became 1.2. After adding 500 ppm of titanium tetraisopropoxide (based on the resin components) to the flask, the flask contents were allowed to react at 230° C., at normal pressures for 8 hours, and subsequently at reduced pressures of 10 to 15 mmHg for 4 hours. After further adding 1% by mol of trimellitic anhydride (based on all the resin components) to the flask, the flask contents were allowed to react at 180° C., at normal pressures for 3 hours. Thus, an amorphous polyester resin A-1 was prepared.

The Tg2nd of the amorphous polyester resin A-1 was 55° C.

Preparation of Dispersion Liquid of Resin Particles (B1) (Resin Particle Dispersion Liquid B1) In a reaction vessel equipped with a stirrer, a heating cooling device, and a thermometer, 3,710 parts of water and 200 parts of polyoxyethylene-1-(allyoxymethyl)alkyl ether sulfate ammonium (AKUARON KH-1025, product of DKS Co., Ltd.) were put and stirred at 200 rpm for homogenization. The homogenized mixture was heated to raise the temperature of the system to 75° C., 90 parts of a 10% aqueous solution of ammonium persulfate were added, and then a mixed solution containing 450 parts of styrene, 250 parts of butyl acrylate, and 300 parts of methacrylic acid was added dropwise over a period of 4 hours. After the dropwise addition, the mixture was aged at 75° C. for 4 hours, thus obtaining a fine particle dispersion liquid (W0-1) containing a shell resin (b1-1) that was a copolymer of the above monomers and polyoxyethylene-1-(allyloxymethyl)alkyl ether sulfate ammonium.

In a reaction vessel equipped with a stirrer, a heating cooling device, and a thermometer, 667 parts of the fine particle dispersion liquid (W0-1) and 248 parts of water were put, and 0.267 parts of tert-butyl hydroperoxide (PERBUTYL H, product of NOF CORPORATION) was added thereto. The mixture was heated to raise the temperature of the system to 70° C., and then 43.3 parts of styrene, 23.3 parts of butyl acrylate, and 18.0 parts of a 1% by mass aqueous solution of ascorbic acid were added dropwise over a period of 2 hours. After the dropwise addition, the mixture was aged at 70° C. for 4 hours for copolymerizing the above monomers using the fine particles in the fine particle dispersion liquid (W0-1) as seeds, thus obtaining a dispersion liquid of resin particles (B1) each containing both the resin (b1-1) and a resin (b2-1) as the copolymer (hereinafter "resin particle dispersion liquid B1").

The volume average particle diameter of the resin particles (B1) was 17.2 nm as measured by a dynamic light scattering method (using a light scattering electrophoresis apparatus ELS-8000, product of Otsuka Electronics Co., Ltd.).

Each of the resin particles (B1) in the resin particle dispersion was found to contain both the resin (b1-1) and the resin (b2-1) as constituent components in the same particle by the following method using a transmission electron microscope.

Specifically, 2 parts of gelatin (COOK GELATIN, product of MORINAGA MILK INDUSTRY CO., LTD.) were dissolved in 15 parts of water warmed to 95° C.-100° C., and the resulted aqueous solution of gelatin was air-cooled to 40° C. The resin particle dispersion liquid B1 was mixed therein so that the ratio became 1:1, followed by stirring. The mixture was cooled at 10° C. for 1 hour, thus preparing a hardened gel.

The gel was cut using an ultramicrotome (ULTRAMICROTOME UC7, FC7, product of Leica Microsystems GmbH) under a controlled temperature of −80° C. to prepare a section having a thickness of 80 nm. The section was stained with a 2% aqueous solution of ruthenium tetroxide in vapor phase for 5 minutes, and then observed using a transmission electron microscope (H-7100, product of Hitachi High-Tech Corporation).

Preparation of Dispersion Liquid of Resin Particles (B2) (Resin Particle Dispersion Liquid B2)

In a reaction vessel equipped with a stirrer and a thermometer, 683 parts of water, 11 parts of a sodium salt of a sulfate of ethylene oxide adduct of methacrylic acid (ELEMINOL RS-30, product of Sanyo Chemical Industries, Ltd.), 138 parts of styrene, 138 parts of methacrylic acid, and 1 part of ammonium persulfate were put and stirred at a revolution of 400 rpm for 15 minutes. Thus, a white emulsion was prepared. The white emulsion was heated to raise the temperature of the system to 75° C., and allowed to react for 5 hours. A 1% aqueous solution of ammonium persulfate in an amount of 30 parts was further added to the emulsion, and the emulsion was aged at 75° C. for 5 hours. Thus, an aqueous dispersion liquid containing resin particles (B2) being a vinyl resin (i.e., a copolymer of styrene, methacrylic acid, and a sodium salt of a sulfate of ethylene oxide adduct of methacrylic acid) was prepared (hereinafter "resin particle dispersion liquid B2").

Synthesis of Prepolymer C-1 (Modified Polyester Resin C-1)

A reaction vessel equipped with a condenser tube, a stirrer, and a nitrogen introducing tube was charged with diol components comprising 100% by mol of 3-methyl-1,5-pentanediol, dicarboxylic acid components comprising 40% by mol of isophthalic acid and 60% by mol of adipic acid, and 1% by mol (based on all monomers) of trimellitic anhydride, along with 1,000 ppm (based on the resin components) of titanium tetraisopropoxide, such that the molar ratio (OH/COOH) of hydroxyl groups to carboxyl groups became 1.5.

The vessel contents were heated to 200° C. over a period of about 4 hours and thereafter heated to 230° C. over a period of 2 hours, and the reaction was continued until outflow water was no more produced.

The vessel contents were further allowed to react under reduced pressures of from 10 to 15 mmHg for 5 hours. Thus, an intermediate polyester C-1 was prepared.

Next, a reaction vessel equipped with a condenser tube, a stirrer, and a nitrogen introducing tube was charged with the intermediate polyester C-1 and isophorone diisocyanate (IPDI) such that the molar ratio of isocyanate groups in IPDI to hydroxyl groups in the intermediate polyester became 2.0. The vessel contents were diluted with ethyl acetate to become a 50% ethyl acetate solution and further allowed to react at 100° C. for 5 hours. Thus, a prepolymer C-1 was prepared.

In Examples and Comparative Examples described below, the prepolymer C-1 was converted into a polyester resin component C-1, corresponding to the polyester resin component A of the present disclosure, in the process of preparing a toner.

The Tg2nd of the prepolymer C-1 was −40° C.

Synthesis of Crystalline Polyester Resin D-1

A 5-L four-neck flask equipped with a nitrogen inlet tube, a dewatering tube, a stirrer, and a thermocouple was charged with dodecanedioic acid and 1,6-hexanediol such that the molar ratio (OH/COOH) of hydroxyl groups to carboxyl groups became 0.9. After adding 500 ppm (based on the resin components) of titanium tetraisopropoxide to the flask, the flask contents were allowed to react at 180° C. for 10 hours, thereafter at 200° C. for 3 hours, and further under a pressure of 8.3 kPa for 2 hours. Thus, a crystalline polyester resin D-1 was prepared.

The melting point (mp) of the crystalline polyester resin D-1 was 70° C.

Preparation of Crystalline Polyester Resin Dispersion Liquid

In a vessel equipped with a stirrer and a thermometer, 50 parts of the crystalline polyester resin D-1 and 450 parts of ethyl acetate were put and heated to 80° C. under stirring, maintained at 80° C. for 5 hours, and cooled to 30° C. over a period of 1 hour. The resulting liquid was thereafter subjected to a dispersion treatment using a bead mill (ULTRAVISCOMILL, product of AIMEX CO., LTD.) filled with 80% by volume of zirconia beads having a diameter of 0.5 mm, at a liquid feeding speed of 1 kg/hour and a disc peripheral speed of 6 m/sec. This dispersing operation was repeated 3 times (3 passes). Thus, a crystalline polyester resin dispersion liquid 1 was prepared.

Preparation of Master Batch

First, 1,200 parts of water, 500 parts of a carbon black (PRINTEX 35, product of Degussa AG, having a DBP oil absorption of 42 mL/100 mg and a pH of 9.5), and 500 parts of the amorphous polyester resin A-1 were mixed using a HENSCHEL MIXER (product of Mitsui Mining Co., Ltd.). The mixture was kneaded with a double roll at 150° C. for 30 minutes, thereafter rolled to cool, and pulverized using a pulverizer. Thus, a master batch 1 was prepared.

Preparation of Wax Dispersion Liquid

In a vessel equipped with a stirrer and a thermometer, 50 parts of a paraffin wax (HNP-9, product of NIPPON SEIRO CO., LTD., a hydrocarbon wax having a melting point of 75° C., and a solubility parameter (SP) of 8.8) serving as a release agent 1 and 450 parts of ethyl acetate were put, then heated to 80° C. under stirring, maintained at 80° C. for 5 hours, and cooled to 30° C. over a period of 1 hour. The resulting liquid was subjected to a dispersion treatment using a bead mill (ULTRAVISCOMILL, product of AIMEX CO., LTD.) filled with 80% by volume of zirconia beads having a diameter of 0.5 mm, at a liquid feeding speed of 1 kg/hour and a disc peripheral speed of 6 m/sec. This dispersing operation was repeated 3 times (3 passes). Thus, a wax dispersion liquid 1 was prepared.

Synthesis of Ketimine Compound

In a reaction vessel equipped with a stirrer and a thermometer, 170 parts of isophoronediammne and 75 parts of methyl ethyl ketone were put and allowed to react at 50° C. for 5 hours. Thus, a ketimine compound 1 was prepared. The ketimine compound 1 was found to have an amine value of 418.

Preparation of Oil Phase

In a vessel, 500 parts of the wax dispersion liquid 1, 956 parts of the crystalline polyester resin dispersion liquid 1, 76 parts of the prepolymer C-1, 152 parts of the prepolymer C-2, 836 parts of the amorphous polyester resin A-1, 100 parts of the master batch 1, and 2 parts of the ketimine compound 1 as a curing agent were put and mixed using a TK HOMOMIXER (product of PRIMIX Corporation) at a revolution of 5,000 rpm for 60 minutes. Thus, an oil phase 1 was prepared.

Preparation of Aqueous Phase

A water phase was prepared by stir-mixing 990 parts of water, 83 parts of the resin particle dispersion liquid B1, 37 parts of a 48.5% aqueous solution of sodium dodecyl diphenyl ether disulfonate (ELEMINOL MON-7, product of Sanyo Chemical Industries, Ltd.), and 90 parts of ethyl acetate. The water phase was a milky white liquid. Thus, an aqueous phase 1 was prepared.

Emulsification and Solvent Removal

In the vessel containing the oil phase 1, 1,200 parts of the aqueous phase 1 were mixed using a TK HOMOMIXER at a revolution of 13,000 rpm for 20 minutes. Thus, an emulsion slurry 1 was prepared. The emulsion slurry 1 was put in a vessel equipped with a stirrer and a thermometer and subjected to solvent removal at 30° C. for 8 hours and subsequently to aging at 45° C. for 4 hours. Thus, a dispersion slurry 1 was prepared.

Washing and Drying

After 100 parts of the dispersion slurry 1 was filtered under reduced pressures, the following operations were carried out.

(1) 100 parts of ion-exchange water were added to the resulted filter cake and mixed using a TK HOMOMIXER (at a revolution of 12,000 rpm for 10 minutes), followed by filtration;

(2) 100 parts of a 10% aqueous solution of sodium hydroxide were added to the filter cake of (1) and mixed using a TK HOMOMIXER (at a revolution of 12,000 rpm for 30 minutes), followed by filtration under reduced pressures;

(3) 100 parts of a 10% aqueous solution of hydrochloric acid were added to the filter cake of (2) and mixed using a TK HOMOMIXER (at a revolution of 12,000 rpm for 10 minutes, followed by filtration, and (4) 300 parts of ion-exchange water was added to the filter cake of (3) and mixed therewith using a TK HOMOMIXER (at a revolution of 12,000 rpm for 10 minutes), followed by filtration. These operations (1) to (4) were repeated twice, thus obtaining a filter cake.

The filter cake was dried by a circulating air dryer at 45° C. for 48 hours and then filtered with a mesh having an opening of 75 μm. Thus, toner base particles 1 were prepared.

External Addition Treatment

Next, 100 parts of the toner base particles 1 were mixed with 2.2 parts of a hydrophobic silica 1 having an average particle diameter of 160 nm, 1.0 part of a titanium oxide having an average particle diameter of 20 nm, and 0.8 parts of a hydrophobic silica powder having an average particle diameter of 15 nm using a HENSCHEL MIXER. Thus, a toner 1 was prepared.

Example 2

The procedure in Example 1 was repeated except that the amount of the crystalline polyester resin dispersion liquid 1 was changed to 224 parts in the Preparation of Oil Phase.

Thus, toner base particles 2 were prepared. A toner 2 was prepared using the toner base particles 2.

Example 3

The procedure in Example 1 was repeated except that the amount of the crystalline polyester resin dispersion liquid 1 was changed to 1,791 parts in the Preparation of Oil Phase.

Thus, toner base particles 3 were prepared. A toner 3 was prepared using the toner base particles 3.

Example 4

The procedure in Example 1 was repeated except for replacing the hydrophobic silica with another hydrophobic silica 2 having an average primary particle diameter of 70 nm in the External Addition Treatment. Thus, a toner 4 was prepared.

Example 5

The procedure in Example 1 was repeated except for replacing the hydrophobic silica 1 with another hydrophobic silica 3 having an average primary particle diameter of 220 nm in the External Addition Treatment. Thus, a toner 5 was prepared.

Example 6

The procedure in Example 1 was repeated except for replacing the hydrophobic silica 1 with another hydrophobic silica 4 having an average primary particle diameter of 50 nm in the External Addition Treatment. Thus, a toner 6 was prepared.

Example 7

The procedure in Example 1 was repeated except for replacing the hydrophobic silica 1 with another hydrophobic silica 5 having an average primary particle diameter of 240 nm in the External Addition Treatment. Thus, a toner 7 was prepared.

Example 8

The procedure in Example 1 was repeated except that the stirring time using the TK HOMOMIXER was changed to 30 minutes in the Emulsification and Solvent Removal.

Thus, a toner 8 was prepared.

Example 9

The procedure in Example 1 was repeated except that the stirring time using the TK HOMOMIXER was changed to 10 minutes in the Emulsification and Solvent Removal.

Thus, a toner 9 was prepared.

Example 10

The procedure in Example 1 was repeated except that the amount of the crystalline polyester resin dispersion liquid 1 was changed to 1,500 parts in the Preparation of Oil Phase, the stirring time using the TK HOMOMIXER was changed to 30 minutes in the Emulsification and Solvent Removal, and the hydrophobic silica 1 was replaced with the hydrophobic silica 2 having an average primary particle diameter of 70 nm in the External Addition Treatment. Thus, a toner 10 was prepared.

Example 11

The procedure in Example 1 was repeated except that the amount of the crystalline polyester resin dispersion liquid 1 was changed to 458 parts in the Preparation of Oil Phase, the stirring time using the TK HOMOMIXER was changed to 10 minutes in the Emulsification and Solvent Removal, and the hydrophobic silica 1 was replaced with the hydrophobic silica 3 having an average primary particle diameter of 220 nm in the External Addition Treatment. Thus, a toner 11 was prepared.

Comparative Example 1

The procedure in Example 1 was repeated except that the crystalline polyester resin dispersion liquid 1 was not added in the Preparation of Oil Phase. Thus, a toner 12 was prepared.

Comparative Example 2

The procedure in Example 1 was repeated except for replacing the resin particle dispersion liquid B1 with the resin particle dispersion liquid B2. Thus, a toner 13 was prepared.

Comparative Example 3

The procedure in Example 1 was repeated except that the sodium hydroxide was not added in (2) of the Washing and Drying process. Thus, a toner 14 was prepared.

Comparative Example 4

The procedure in Example 1 was repeated except that the amount of the crystalline polyester resin dispersion liquid 1 was changed to 1,791 parts in the Preparation of Oil Phase, the stirring time using the TK HOMOMIXER was changed to 30 minutes in the Emulsification and Solvent Removal, and the hydrophobic silica 1 was replaced with the hydrophobic silica 4 having an average primary particle diameter of 50 nm in the External Addition Treatment. Thus, a toner 15 was prepared.

Measurement of Embedment Degree of External Additive

First, 10 g of the prepared toner and 20 g of a carrier (to be described later) were placed in a 50-mL glass vial and stirred at 67 Hz for 60 minutes using a rocking mill (RM05S, product of SEIWA GIKEN Corporation).

After the stirring, the toner was embedded and fixed in an epoxy resin and cut using a focused ion beam —scanning electron microscope (FIB-SEM SU-8230, product of Hitachi High-Technologies Corporation), and a cross-sectional SEM image was observed. The accelerating voltage was set to 30 kv, and the current value was set to 100-500 pA. The embedment degree of the external additive was quantified by analyzing the cross-sectional SEM image of the toner using an image analysis software program as follows. The measurement results are presented in Table 1.

(1) The cross-section of toner was observed with SEM in a shape image mode. A numerical value obtained from the observed data is defined as A.

(2) The cross-section of toner was observed with SEM in a composite image mode. A numerical value obtained from the observed data is defined as B.

(3) In the shape image mode, a binarization processing was performed based on the contrast of the external additive that was strong.

(4) The shape of the toner base particles was captured by SEM in the composition image mode.

(5) A volume (a) of the external additive present on the surface of the toner base particles and a volume (b) of the external additive embedded in the surface of the toner base particles were calculated by combining A and B. The embedment degree (%) of the external additive was calculated from $(b/a)\times100$.

Number Average Primary Particle Diameter of External Additive

The silica particles were observed with a transmission electron microscope (at a magnification of 100,000 times), and 20 or more randomly-selected silica particles were used for measurement and calculation. The calculated average value was defined as the average primary particle diameter of the external additive. The calculation results are presented in Table 1.

Measurement of Storage Elastic Modulus G' at 70° C.

The storage elastic modulus was measured by the following apparatus and measurement conditions. The measurement results are presented in Table 1.

Instrument: ARES-24A (product of Rheometric Scientific, Inc.)
Jig: 25 mm parallel plate
Frequency: 1 Hz
Distortion factor: 10%
Temperature rising rate: 5° C./min Measurement of Average Circularity The average circularity was measured using a flow particle image analyzer (FPIA-3000, product of Sysmex Corporation) under the following conditions. The measurement results are presented in Table 1.

A 1% NaCl aqueous solution was prepared using the first-grade sodium chloride and then passed through a 0.45-μm filter. Next, 0.1 to 5 mL of an alkylbenzene sulfonate as a dispersant was added to 50 to 100 mL of the aqueous solution, and 1 to 10 mg of a toner was further added thereto. The resultant was subjected to a dispersion treatment using an ultrasonic disperser for 1 minute, and the particle concentration was adjusted to 5,000 to 15,000 particles/μL.

A two-dimensional image of each particle was photographed with a CCD (charge-coupled device) camera, and the diameter of a circle having the same area as the photographed image was determined as the equivalent circle diameter. The equivalent circle diameter of 0.6 μm or more was considered effective from the accuracy of the pixels of the CCD and used for calculation of the average circularity. The average circularity was obtained by calculating the circularity ofeach particle, adding up the circularity ofeach particle, and dividing the sum by the total number of particles.

TABLE 1

| | Toner No. | Toner Base Particles No. | Toner Base Particles Average Circularity | Toner Base Particles G' (70° C.) | Crystalline Polyester Addition Amount (parts) | Resin Particles No. | Alkaline Washing | External Additive Type | External Additive Average Primary Particle Diameter (nm) | Embedment Degree (%) |
|---|---|---|---|---|---|---|---|---|---|---|
| Example 1 | Toner 1 | Base 1 | 0.982 | $3.4 \times 10^5$ | 8 | B1 | Yes | Silica 1 | 160 | 25 |
| Example 2 | Toner 2 | Base 2 | 0.977 | $3.9 \times 10^5$ | 2 | B1 | Yes | Silica 1 | 160 | 21 |
| Example 3 | Toner 3 | Base 3 | 0.979 | $2.7 \times 10^5$ | 14 | B1 | Yes | Silica 1 | 160 | 37 |
| Example 4 | Toner 4 | Base 1 | 0.982 | $3.4 \times 10^5$ | 8 | B1 | Yes | Silica 2 | 70 | 34 |
| Example 5 | Toner 5 | Base 1 | 0.982 | $3.4 \times 10^5$ | 8 | B1 | Yes | Silica 3 | 220 | 22 |
| Example 6 | Toner 6 | Base 1 | 0.982 | $3.4 \times 10^5$ | 8 | B1 | Yes | Silica 4 | 50 | 35 |
| Example 7 | Toner 7 | Base 1 | 0.982 | $3.4 \times 10^5$ | 8 | B1 | Yes | Silica 5 | 240 | 19 |
| Example 8 | Toner 8 | Base 4 | 0.964 | $3.3 \times 10^5$ | 8 | B1 | Yes | Silica 1 | 160 | 31 |
| Example 9 | Toner 9 | Base 5 | 0.986 | $3.3 \times 10^5$ | 8 | B1 | Yes | Silica 1 | 160 | 23 |
| Example 10 | Toner 10 | Base 6 | 0.963 | $2.9 \times 10^5$ | 12 | B1 | Yes | Silica 2 | 70 | 40 |
| Example 11 | Toner 11 | Base 7 | 0.986 | $3.7 \times 10^5$ | 4 | B1 | Yes | Silica 3 | 220 | 16 |
| Comparative Example 1 | Toner 12 | Base 8 | 0.981 | $4.2 \times 10^5$ | 0 | B1 | Yes | Silica 1 | 160 | 18 |
| Comparative Example 2 | Toner 13 | Base 9 | 0.979 | $3.1 \times 10^5$ | 8 | B1 | Yes | Silica 1 | 160 | 42 |
| Comparative Example 3 | Toner 14 | Base 10 | 0.980 | $3.7 \times 10^5$ | 8 | B1 | No | Silica 1 | 160 | 14 |
| Comparative Example 4 | Toner 15 | Base 11 | 0.958 | $2.6 \times 10^5$ | 14 | B1 | Yes | Silica 4 | 50 | 73 |

Measurement of Tg1st and Tg2nd of Toner, Tg1st of THF-insoluble Matter, and Tg of Polyester Resin Components A-1, C-1, and D-1

First, 1 g of the toner was put in 100 mL of THF and subjected to Soxhlet extraction to obtain THF-soluble matter and THF-insoluble matter. The THF-soluble matter and the THF-insoluble matter were dried in a vacuum dryer for 24 hours, thus obtaining the polyester resin component C-1 (or mixtures with the crystalline polyester resin D-1 in Examples 9 to 11) from the THF soluble matter and a mixture of a polyester resin component A-1 and a polyester resin component B-1 from the THF-insoluble matter. These mixtures were treated as target samples. Also, the toner was treated as a target sample for measuring Tg 1st and Tg2nd of the toner.

Next, about 5.0 mg of each target sample was put in an aluminum sample container. The sample container was put on a holder unit and set in an electric furnace. The temperature was raised from −80° C. to 150° C., at a temperature rising rate of 1.0° C./min ("first heating") in nitrogen atmosphere. The temperature was thereafter lowered from 150° C. to −80° C., at a temperature falling rate of 1.0° C./min and raised to 150° C., again at a temperature rising rate of 1.0° C./min ("second heating"). In each of the first heating and the second heating, a DSC curve was obtained by a differential scanning calorimeter (Q-200, product of TA Instruments).

The obtained DSC curves were analyzed with an analysis program installed in Q-200. By selecting the DSC curve obtained in the first heating, the glass transition temperature Tg1st of the target sample in the first heating was determined. Similarly, by selecting the DSC curve obtained in the second heating, the glass transition temperature Tg2nd of the target sample in the second heating was determined.

In addition, by selecting the DSC curve obtained in the first temperature rising with an analysis program installed in Q-200, an endothermic peak temperature in the first temperature rising was determined as a melting point in the first temperature rising.

Similarly, by selecting the DSC curve obtained in the second temperature rising, an endothermic peak temperature in the second temperature rising was determined as a melting point in the second temperature rising.

In the present disclosure, the melting point and the glass transition temperature Tg of each toner constituent component, such as the polyester resin components A-1, C-1, and D-1, are the endothermic peak temperature and the glass transition temperature Tg2nd, respectively, each measured in the second temperature rising, unless otherwise specified.

With respect to THF-insoluble matter in the toner, in the modulation mode, the temperature was raised from −80° C. to 150° C., at a temperature rising rate of 1.0° C./min ("first heating") with a modulation temperature amplitude of ±1.0° C./min. The obtained DSC curves were converted into DSC curves on a graph having the vertical axis indicating "Reversing Heat Flow", using an analysis program installed in Q-200, and the onset value was taken as Tg. Thus, thePTg1st was determined.

The measurement results of Tg 1st and Tg2nd of toner and Tg1st of THF-insoluble matter are presented in Table 2.

Mass Ratio of Polyester Resin Components A-1, C-1 and D-1

The mass ratio between the polyester resin component A-1 and the crystalline polyester resin D-1 was determined from the THF-soluble matter obtained by Soxhlet extraction, and the constitutional ratio between the polyester resin component A-1 and the crystalline polyester resin D-1 was determined. The mass ratio of the polyester resin component C-1 was determined from the THF-insoluble matter obtained by Soxhlet extraction, and the constitutional ratio of the polyester resin component C-1 was determined.

The measurement results are presented in Table 2.

TABLE 2

| | Ratio (mass %) of Polyester in Toner Base Particles | | | Thermal Properties of Toner | | Tg1st of THE-insoluble |
|---|---|---|---|---|---|---|
| | A-1 | C-1 | D-1 | Tg1st | Tg2nd | Matter |
| Example 1 | 80 | 11 | 9 | 56 | 35 | −25 |
| Example 2 | 86 | 12 | 2 | 58 | 38 | −25 |
| Example 3 | 74 | 10 | 16 | 54 | 23 | −25 |
| Example 4 | 80 | 11 | 9 | 56 | 35 | −25 |
| Example 5 | 80 | 11 | 9 | 56 | 35 | −25 |
| Example 6 | 80 | 11 | 9 | 56 | 35 | −25 |
| Example 7 | 80 | 11 | 9 | 56 | 35 | −25 |
| Example 8 | 80 | 11 | 9 | 56 | 35 | −25 |
| Example 9 | 80 | 11 | 9 | 56 | 35 | −25 |
| Example 10 | 76 | 10 | 14 | 54 | 24 | −25 |
| Example 11 | 84 | 11 | 5 | 57 | 36 | −25 |
| Comparative Example 1 | 88 | 12 | 0 | 59 | 40 | −25 |
| Comparative Example 2 | 80 | 11 | 9 | 56 | 35 | −25 |
| Comparative Example 3 | 80 | 11 | 9 | 56 | 35 | −25 |
| Comparative Example 4 | 74 | 10 | 16 | 53 | 23 | −25 |

Preparation of Carrier

A resin layer coating liquid was prepared by dispersing 100 parts of a silicone resin (organo straight silicone), 5 parts of γ-(2-aminoethyl) aminopropyl trimethoxysilane, and 10 parts of a carbon black in 100 parts of toluene by a homomixer for 20 minutes. The resin layer coating liquid was applied to the surfaces of spherical magnetites having an average particle diameter of 50 μm in an amount of 1,000 parts using a fluidized bed coating device. Thus, a carrier was prepared.

Preparation of Developer

A developer was prepared by mixing 5 parts of each toner and 95 parts by mass of the carrier using a ball mill. The obtained developers were subjected to the following evaluations. The evaluation results are presented in Table 3.

Cleanability

Each developer was set in a color multifunction peripheral (IMAGIO MP C4500, product of Ricoh Co., Ltd.). In a laboratory environment at 21° C., and 65% RH, an image chart having an image area ratio of 5% was output on 50,000 sheets (A4 size, lateral) at 3 prints/job using the image forming apparatus.

After that, in a laboratory environment at 32° C., and 54% RH, a test image chart having three vertical band patterns (in the sheet advancing direction) having a width of 43 mm was output on 100 sheets (A4 size, lateral). The resultant image and the photoconductor were visually observed, and the cleanability was evaluated based on the following criteria. Ranks A, B, and C have no problem in practical use.

Evaluation Criteria

A: Toner particles having slipped through due to defective cleaning are not visually confirmed on either the print sheet or the photoconductor, and no streak-like toner slippage is confirmed even when the photoconductor is observed with a microscope in the longitudinal direction.

B: Toner particles having slipped through due to defective cleaning are not visually confirmed on either the print sheet or the photoconductor.

C: Toner particles having slipped through due to defective cleaning are slightly confirmed on the photoconductor but not confirmed on the print sheet.

D: Toner particles having slipped through due to defective cleaning are visually confirmed on either the print sheet or the photoconductor.

Low-temperature Fixability

Each developer was set in a color multifunction peripheral (IMAGIO MP C4500, product of Ricoh Co., Ltd.), and a solid image having a rectangular shape of 2 cm 15 cm and a toner deposition amount of 0.40 $mg/cm^2$ was formed on sheets of PPC paper TYPE 6000<70W> A4 Machine Direction (product of Ricoh Co., Ltd.) in the monochrome mode. The surface temperature of the fixing roller was changed, and whether an offset had occurred or not was observed at each temperature. Here, the offset is a phenomenon in which a residual image of the solid image is fixed at a position other than the desired position. The lowest fixing temperature at which the cold offset did not occur ("lower-limit fixable temperature") was determined to evaluate low-temperature fixability according to the following evaluation criteria.

The solid image was formed on a position 3.0 cm away from the leading end of the sheet in the sheet feeding direction. The speed of the sheet passing through the nip portion of the fixing device was 300 mm/s.

Evaluation Criteria for Low-temperature Fixability

A: The lower-limit fixable temperature is 130° C. or lower.

B: The lower-limit fixable temperature is higher than 130° C. but 135° C. or lower.

C: The lower-limit fixable temperature is higher than 135° C. but 140° C. or lower.

D: The lower-limit fixable temperature is higher than 140° C.

Comprehensive Evaluation

A: The low-temperature fixability rank is A or B, and the cleanability rank is A.

B: At least one of the low-temperature fixability rank and the cleanability rank is C.

D: At least one of the low-temperature fixability rank and the cleanability rank is D.

TABLE 3

| | Evaluation Results | | |
|---|---|---|---|
| | Low-temperature Fixability | Clean-ability | Compre-hensive Evaluation |
| Example 1 | B | B | B |
| Example 2 | C | A | B |
| Example 3 | A | C | B |
| Example 4 | B | C | B |
| Example 5 | B | A | A |
| Example 6 | B | C | B |
| Example 7 | B | A | A |
| Example 8 | B | C | B |

TABLE 3-continued

| | Evaluation Results | | |
|---|---|---|---|
| | Low-temperature Fixability | Clean-ability | Compre-hensive Evaluation |
| Example 9 | B | B | B |
| Example 10 | A | C | B |
| Example 11 | C | A | B |
| Comparative Example 1 | D | B | D |
| Comparative Example 2 | A | D | D |
| Comparative Example 3 | D | B | D |
| Comparative Example 4 | A | D | D |

Embodiments of the present invention include the following items.

<1> A toner comprising:

toner base particles each comprising:

a binder resin;

a colorant; and a wax;

resin particles adhered to surfaces of the toner base particles; and an external additive adhered to the surfaces of the toner base particles, wherein the toner has a storage elastic modulus G' of $4.0\times10^5$ or less at 70° C.

wherein an embedment degree of the external additive is from 15% to 40%, the embedment degree measured by stirring 10 g of the toner and 20 g of a carrier in a 50-mL vial at 67 Hz for 60 minutes using a rocking mill.

<2> The toner of <1>, wherein the resin particles each comprise:

a core resin (b2); and a shell resin (b1) covering at least part of the core resin.

<3> The toner of <2>, wherein the shell resin comprises a styrene-(meth)acrylate copolymer.

<4> The toner of any one of <1> to <3>, wherein the embedment degree of the external additive is from 18% to 30%.

<5> The toner of any one of <1> to <4>, wherein the external additive has an average primary particle diameter of from 70 to 220 nm.

<6> The toner of any one of <1> to <5>, wherein the toner has an average circularity of from 0.978 to 0.985.

<7> The toner of any one of <1> to <6>, wherein the toner exhibits a glass transition temperature (Tg1st) of from 40° C. to 65° C. in the first temperature rising in a differential scanning calorimetry (DSC), tetrahydrofuran (THF)-insoluble matter of the toner exhibits a glass transition temperature (Tg1st) of from −45° C. to 5° C. in the first temperature rising in the DSC, and THF-soluble matter of the toner exhibits a glass transition temperature (Tg2nd) of from 20° C. to 65° C. in the second temperature rising in the DSC.

<8> The toner of any one of <1> to <7>, wherein the glass transition temperature (Tg1st) and the glass transition temperature (Tg2nd) of the toner in the first temperature rising and the second temperature rising, respectively, in the DSC satisfy Tg1st -Tg2nd>10 [° C.].

<9> The toner of any one of <1> to <8>, wherein the binder resin comprises an amorphous polyester.

<10> The toner of any one of <1> to <9>, wherein the binder resin comprises a modified polyester.

<11> The toner of <10>, wherein the modified polyester comprises a trivalent or tetravalent aliphatic polyol having 3 to 10 carbon atoms as a constituent component.

<12> The toner of <10> or <11>, wherein the modified polyester comprises a diol as a constituent component, and the diol has a main chain containing carbon atoms in an odd number of from 3 to 9 and a side chain containing an alkyl group.

<13> The toner of any one of <10> to <12>, wherein the modified polyester has at least one of urethane bond and urea bond.

<14> The toner of any one of <1> to <13>, wherein the binder resin comprises a crystalline polyester.

<15> A developer comprising: the toner of any one of <1> to <14>; and a carrier.

<16> A toner accommodating unit comprising:

a container; and the toner any one of <1> to <14> accommodated in the container.

<17> An image forming apparatus comprising:

the toner accommodating unit of <16>.

<18> An image forming method comprising:

forming an electrostatic latent image on an electrostatic latent image bearer;

developing the electrostatic latent image with the toner of any one of <1> to <14> to form a toner image;

transferring the toner image formed on the electrostatic latent image onto a medium; and fixing the toner image on the medium.

<19> A method for manufacturing toner of any one of <1> to <14> comprising:

adhering resin particles to surfaces of toner base particles to form composite particles; and removing at least part of the resin particles from the composite particles.

<20> The method of <19>, wherein the removing includes washing with a basic aqueous solution.

The toner according to above <1> to <14>, the developer according to above <15>, the toner accommodating unit according to above <16>, the image forming apparatus according to above <17>, the image forming method according to the above <18>, and the method for manufacturing toner according to above (19) and (20) solve the various conventional problems and achieve the object of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A toner, comprising:

toner base particles each comprising:

a binder resin;

a colorant; and a wax;

resin particles adhered to surfaces of the toner base particles; and an external additive adhered to the surfaces of the toner base particles, wherein the toner has a storage elastic modulus G' of 4.0×10' or less at 70° C.

wherein an embedment degree of the external additive is from 15% to 40%, the embedment degree measured by stirring 10 g of the toner and 20 g of a carrier in a 50-mL vial at 67 Hz for 60 minutes using a rocking mill, wherein a content of crystalline polyester resin in the toner is from 2% to 14% by weight, based on a total weight of the toner, wherein the resin particles each comprise a core resin and a shell resin covering at least part of the core resin, and wherein the shell resin has a loss elastic modulus G" of from 1.5 to 100 MPa, and wherein the core resin has a loss elastic modulus G" of from 0.01 to 1.0 MPa.

2. The toner of claim 1, wherein the embedment degree of the external additive is from 18% to 30%.

3. The toner of claim 1, wherein the external additive has an average primary particle diameter of from 70 to 220 nm.

4. The toner of claim 1, wherein the toner has an average circularity of from 0.978 to 0.985.

5. A toner accommodating unit, comprising:

a container; and the toner of claim 1 accommodated in the container.

6. An image forming apparatus, comprising:

the toner accommodating unit of claim 5.

7. An image forming method, comprising:

forming an electrostatic latent image on an electrostatic latent image bearer;

developing the electrostatic latent image with the toner of claim 1 to form a toner image;

transferring the toner image formed on the electrostatic latent image onto a medium; and fixing the toner image on the medium.

8. A method for manufacturing the toner of claim 1, comprising:

adhering resin particles to surfaces of toner base particles to form composite particles, the resin particles each comprising a core resin and a shell resin covering at least part of the core resin; and removing at least part of the resin particles from the composite particles, thereby obtaining the toner having a content of crystalline polyester resin of from 2% to 14% by weight, based on a total weight of the toner, wherein the shell resin has a loss elastic modulus G" of from 1.5 to 100 MPa, and wherein the core resin has a loss elastic modulus G" of from 0.01 to 1.0 MPa.

9. The method of claim 8, wherein the removing includes washing with a basic aqueous solution.

10. The toner of claim 1, wherein the content of crystalline polyester resin in the toner is from 4% to 12% by weight, based on a total weight of the toner.

11. The toner of claim 1, wherein the binder resin comprises an amorphous polyester resin.

12. The toner of claim 1, wherein the shell resin has a glass transition temperature of from 0° C. to 150° C., and wherein the core resin has a glass transition temperature of from −30° C. to 100° C.

13. The toner according to claim 1, wherein the content of crystalline polyester resin in the toner is from 2% to 9% by weight, based on a total weight of the toner.

14. A toner, comprising:

toner base particles each comprising:

a binder resin;

a colorant; and a wax;

resin particles adhered to surfaces of the toner base particles; and an external additive adhered to the surfaces of the toner base particles, wherein the toner has a storage elastic modulus G' of 4.0×10 or less at 70° C., wherein an embedment degree of the external additive is from 15% to 40%, the embedment degree measured by stirring 10 g of the toner and 20 g of a carrier in a 50-mL vial at 67 Hz for 60 minutes using a rocking mill, wherein a content of crystalline polyester resin in the toner is from 2% to 14% by weight, based on a total weight of the toner, wherein the resin particles each comprise a core resin and a shell resin covering at least part of the core resin, wherein the shell resin has a glass transition temperature of from 0° C. to 150° C., and wherein the core resin has a glass transition temperature of from −30° C. to 100° C.

* * * * *